United States Patent
Kim et al.

(10) Patent No.: US 11,277,236 B2
(45) Date of Patent: Mar. 15, 2022

(54) METHOD FOR TRANSMITTING OR RECEIVING DOWNLINK SIGNAL BY TERMINAL AND BASE STATION IN WIRELESS COMMUNICATION SYSTEM AND DEVICE FOR SUPPORTING SAME

(71) Applicant: LG Electronics Inc., Seoul (KR)

(72) Inventors: Jaehyung Kim, Seoul (KR); Joonkui Ahn, Seoul (KR); Hyunsoo Ko, Seoul (KR); Byounghoon Kim, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 482 days.

(21) Appl. No.: 16/325,061

(22) PCT Filed: Aug. 11, 2017

(86) PCT No.: PCT/KR2017/008751
§ 371 (c)(1),
(2) Date: Feb. 12, 2019

(87) PCT Pub. No.: WO2018/030843
PCT Pub. Date: Feb. 15, 2018

(65) Prior Publication Data
US 2021/0288771 A1 Sep. 16, 2021

Related U.S. Application Data

(60) Provisional application No. 62/373,991, filed on Aug. 12, 2016.

(51) Int. Cl.
*H04W 72/04* (2009.01)
*H04L 5/00* (2006.01)

(52) U.S. Cl.
CPC .......... *H04L 5/0048* (2013.01); *H04L 5/0092* (2013.01); *H04W 72/042* (2013.01)

(58) Field of Classification Search
CPC .......... H04W 72/042; H04W 72/0446; H04W 72/0453; H04W 72/0413; H04W 76/27;
(Continued)

(56) References Cited

U.S. PATENT DOCUMENTS

2008/0205351 A1  8/2008  Lindoff et al.
2016/0233997 A1  8/2016  Lee et al.
(Continued)

FOREIGN PATENT DOCUMENTS

KR  1020100063625  6/2010
KR  1020100113036  10/2010
(Continued)

OTHER PUBLICATIONS

PCT International Search Report and Written Opinion in International Application No. PCT/KR2017/008751, dated Nov. 17, 2017, 21 pages (with English translation).
(Continued)

*Primary Examiner* — Eva Y Puente
(74) *Attorney, Agent, or Firm* — Fish & Richardson P.C.

(57) ABSTRACT

Disclosed are a method for mutually transmitting or receiving a downlink signal by a terminal and a base station in a wireless communication system and a device for supporting the same. More particularly, disclosed are a method for transmitting or receiving a signal and a device for supporting the same, in which when a subcarrier interval rapidly changes in a continuous time area, such as a multi-media broadcast multicast service single frequency network (MBSFN), a receiver can more reliably receive a signal (for example: a data signal) transmitted in a resource area where the subcarrier interval has rapidly changed.

9 Claims, 32 Drawing Sheets

(58) Field of Classification Search
CPC ........... H04W 74/0833; H04W 72/046; H04W 76/11; H04W 56/001; H04W 72/1268; H04W 80/02; H04W 72/0406; H04L 5/0048; H04L 5/0051; H04L 5/0055; H04L 5/0094; H04L 1/0026; H04L 1/1819; H04L 5/0053; H04L 1/1896; H04L 5/0007; H04L 1/1812; H04L 27/26025; H04L 27/2607; H04B 7/0617; H04B 7/0695; H04B 1/713; H04B 7/0417; H04B 7/0626; H04B 10/11; H04B 10/25; H04B 17/318; H04B 1/715; H04B 7/0408; H04B 7/0413; H04B 7/0421; H04B 7/0456
USPC ........................................................ 370/329
See application file for complete search history.

(56) References Cited

U.S. PATENT DOCUMENTS

| | | | | |
|---|---|---|---|---|
| 2018/0343153 A1* | 11/2018 | Zhang | .................. | H04L 5/0007 |
| 2019/0059075 A1* | 2/2019 | Hayashi | ................ | H04L 5/0092 |
| 2019/0191456 A1* | 6/2019 | Koorapaty | .......... | H04L 27/0006 |
| 2021/0168745 A1* | 6/2021 | Harada | ............... | H04W 56/001 |

FOREIGN PATENT DOCUMENTS

| | | |
|---|---|---|
| KR | 20100118063 | 11/2010 |
| KR | 1020110017830 | 2/2011 |
| KR | 101480531 | 1/2015 |
| KR | 1020150026949 | 3/2015 |

OTHER PUBLICATIONS

Samsung, "Discussions on reference signal design for NR," R1-165436, 3GPP TSG RAN WG1 Meeting #85, Nanjing, China, May 23-27, 2016, 4 pages.

Texas Instruments, "EUTRA Downlink Unicast Reference Signal Design Aspects," R1-061743, 3GPP TSG RAN WG1LTE Ad Hoc, Cannes, France, Jun. 27-30, 2006, 3 pages.

LG Electronics, "Downlink Performance with Relay," R1-102428, 3GPP TSG RAN WG1 Meeting #60bis, Beijing, China, Apr. 12-16, 2010, 5 pages.

* cited by examiner

Antenna port 4
Mapping of MBSFN reference signals (extended cyclic prefix, Δf = 15kHz)

Mapping of MBSFN reference signals (extended cyclic prefix, Δf= 7.5kHz)

METHOD FOR TRANSMITTING OR RECEIVING DOWNLINK SIGNAL BY TERMINAL AND BASE STATION IN WIRELESS COMMUNICATION SYSTEM AND DEVICE FOR SUPPORTING SAME

CROSS-REFERENCE TO RELATED APPLICATIONS

This application is a National Stage application under 35 U.S.C. § 371 of International Application No. PCT/KR2017/008751, filed on Aug. 11, 2017, which claims the benefit of U.S. Provisional Application No. 62/373,991, filed on Aug. 12, 2016. The disclosures of the prior applications are incorporated by reference in their entirety.

TECHNICAL FIELD

The following description, relates to a wireless communication system, and more particularly, to a method for mutually transmitting or receiving a signal between a user equipment and a base station in a wireless communication system and a device for supporting the same.

Particularly, the present invention relates to a method for transmitting or receiving a signal and a device for supporting the same, in which when a subcarrier spacing rapidly changes in a continuous time area, such as a multi-media broadcast multicast service single frequency network (MBSFN), a receiver can more reliably receive a signal (for example: a data signal) transmitted from a resource area where the subcarrier spacing has rapidly changed.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

DISCLOSURE

Technical Problem

An object of the present invention is to provide a method for transmitting or receiving a signal from between a user equipment (UE) and a base station in a communication system which is newly proposed and an apparatus for supporting the same.

Particularly, the present invention relates to a signal system and a device for supporting the same, in which when a subcarrier spacing rapidly changes in a continuous time area, such as a multi-media broadcast multicast service single frequency network (MBSFN), a receiver can more reliably receive a signal (for example: a data signal) transmitted from a resource area where the subcarrier spacing has rapidly changed.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention provides a method for mutually transmitting or receiving a signal between a user equipment (UE) and a base station in a wireless communication system and a device for supporting the same. Particularly, the present invention provides a method for transmitting or receiving a signal and a device for supporting the same, in which when a subcarrier spacing rapidly changes in a continuous time area, such as a multi-media broadcast multicast service single frequency network (MBSFN), a receiver can more reliably receive a signal (for example: a data signal) transmitted from a resource area where the subcarrier spacing has rapidly changed.

In the present invention, a base station or a UE may be used as an entity for transmitting a specific signal (e.g., data signal). Therefore, a configuration according to the present invention will be described based on that the base station transmits a downlink signal to the UE and the UE receives the downlink signal from the base station. However, the configuration according to the present invention may be applied to an operation for transmission and reception of an uplink signal in accordance with an implementation example.

In one aspect of the present invention, a method for transmitting a downlink signal by a base station in a wireless communication system comprises transmitting a downlink signal, which includes a reference signal, through a plurality of second symbols continuous with a first symbol in a time dimension, a second subcarrier spacing smaller than a first subcarrier spacing applied to the first symbol being applied to the second symbols, wherein a first frequency area to which the reference signal is transmitted from a first symbol of the second symbols, to which the reference signal is transmitted in the order of time dimension includes a second frequency area to which the reference signal is transmitted from a second symbol of the second symbols, to which the reference signal is transmitted in the order of time dimension.

In another aspect of the present invention, a base station for transmitting a downlink signal in a wireless communication system comprises a transmitter; a receiver; and a processor operated by being connected with the transmitter and the receiver, wherein the processor is configured to transmit a downlink signal, which includes a reference signal, through a plurality of second symbols continuous with a first symbol in a time dimension, a second subcarrier spacing smaller than a first subcarrier spacing applied to the first symbol being applied to the second symbols, and a first frequency area to which the reference signal is transmitted from a first symbol of the second symbols, to which the reference signal is transmitted in the order of time dimension includes a second frequency area to which the reference signal is transmitted from a second symbol of the second symbols, to which the reference signal is transmitted in the order of time dimension.

In this case, the first subcarrier spacing may be a value of four times or more of the second subcarrier spacing.

The downlink signal may include a data signal, and the reference signal may be used to estimate frequency offset applied to the data signal.

The first frequency area may be a full frequency area to which the reference signal is transmitted, or may be a part within the full frequency area to which the reference signal is transmitted.

The first frequency area may be equal to the second frequency area.

A third frequency area to which the reference signal is transmitted from a third symbol of the plurality of second symbols, to which the reference signal is transmitted in the order of time dimension, may be equal to the second frequency area.

The third symbol of the plurality of second symbols, to which the reference signal is transmitted in the order of time dimension, may be positioned to be spaced apart from the second symbol as much as a certain symbol spacing.

In still another aspect of the present invention in response to the above configuration, a method for receiving a downlink signal by a UE in a wireless communication system comprises receiving a reference signal through some of a plurality of second symbols continuous with a first symbol in a time dimension, a second subcarrier spacing smaller than a first subcarrier spacing applied to the first symbol being applied to some of the second symbols, wherein a first frequency area to which the reference signal is transmitted from a first symbol of some of the second symbols in the order of time dimension includes a second frequency area to which the reference signal is transmitted from a second symbol of some of the second symbols in the order of time dimension; and receiving a downlink signal transmitted through the plurality of second symbols by using phase difference information between the first-order and second-order symbols to which the reference signal is transmitted.

Also, in further still another aspect of the present invention, a UE for receiving a downlink signal in a wireless communication system comprises a transmitter; a receiver; and a processor operated by being connected with the transmitter and the receiver, wherein the processor is configured to receive a reference signal through some of a plurality of second symbols continuous with a first symbol in a time dimension, a second subcarrier spacing smaller than a first subcarrier spacing applied to the first symbol being applied to some of the second symbols, wherein a first frequency area to which the reference signal is transmitted from a first symbol of some of the second symbols in the order of time dimension includes a second frequency area to which the reference signal is transmitted from a second symbol of some of the second symbols in the order of time dimension, and receive a downlink signal transmitted through the plurality of second symbols by using phase difference information between the first-order and second-order symbols to which the reference signal is transmitted.

In further still another aspect of the present invention, a method for transmitting a downlink signal by a base station in a wireless communication system comprises transmitting a synchronization signal through a plurality of second symbols continuous with a first symbol in a time dimension; and transmitting a downlink signal, which includes a reference signal, through a plurality of third symbols continuous with the plurality of second symbols, a second subcarrier spacing smaller than a first subcarrier spacing applied to the second symbols being applied to the third symbols, wherein the synchronization signal is transmitted continuously in a time dimension within the plurality of second symbols.

In further still another aspect of the present invention, a base station for transmitting a downlink signal in a wireless communication system comprises a transmitter; a receiver; and a processor operated by being connected with the transmitter and the receiver, wherein the processor is configured to transmit a synchronization signal through a plurality of second symbols continuous with a first symbol in a time dimension and transmit a downlink signal, which includes a reference signal, through a plurality of third symbols continuous with the plurality of second symbols, a second subcarrier spacing smaller than a first subcarrier spacing applied to the second symbols being applied to the third symbols, and the synchronization signal is transmitted continuously in a time dimension within the plurality of second symbols.

At this time, the first subcarrier spacing may be smaller than or equal to a third subcarrier spacing applied to the first symbol.

A frequency area to which the synchronization signal is transmitted may be a full frequency area to which the reference signal is transmitted, or may be a part within the full frequency area to which the reference signal is transmitted.

The downlink signal may include a data signal, and the synchronization signal may be used to estimate frequency offset applied to the data signal.

The base station may further transmit the synchronization signal through one or more fourth symbols positioned to be spaced apart from the second symbols as much as a spacing of one or more of the third symbols in a time dimension, wherein the first subcarrier spacing is applied to the fourth symbols.

In this case, the one or more fourth symbols may be positioned at the last time area of a specific subframe.

Also, a first frequency area to which the reference signal is transmitted from a first symbol of the plurality of third symbols, to which the reference signal is transmitted in the order of time dimension, may be equal to a second frequency area to which the reference signal is transmitted from a second symbol of the plurality of second symbols, to which the reference signal is transmitted in the order of time dimension.

In further still another aspect of the present invention in response to the above configuration, a method for receiving a downlink signal by a UE in a wireless communication system comprises receiving a synchronization signal through a plurality of second symbols continuous with a first symbol in a time dimension; estimating frequency offset by using the synchronization signal; and receiving a downlink signal, which includes a reference signal, through a plurality of third symbols continuous with the plurality of second symbols, based on the estimated frequency offset, a second subcarrier spacing smaller than a first subcarrier spacing applied to the second symbols being applied to the third symbols.

In further still another aspect of the present invention, a UE for receiving a downlink signal in a wireless communication system comprises a transmitter; a receiver; and a processor operated by being connected with the transmitter and the receiver, wherein the processor is configured to receive a synchronization signal through a plurality of second symbols continuous with a first symbol in a time dimension, estimate frequency offset by using the synchronization signal, and receive a downlink signal, which includes a reference signal, through a plurality of third symbols continuous with the plurality of second symbols, based on the estimated frequency offset, a second subcarrier spacing smaller than a first subcarrier spacing applied to the second symbols being applied to the third symbols.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

According to the present invention, even though a subcarrier spacing is dynamically changed in a wireless communication system which is newly proposed, a receiver can more reliably receive a signal (for example: a data signal) transmitted from a resource area to which the changed subcarrier spacing is applied.

Particularly, according to the present invention, a multimedia broadcast multicast service (MBMS), to which a subcarrier spacing more flexible than that of the legacy LTE system is applied, can be provided.

The effects that can be achieved through the embodiments of the present invention are not limited to what has been particularly described hereinabove and other effects which are not described herein can be derived by those skilled in the art from the following detailed description. That is, it should be noted that the effects which are not intended by the present invention can be derived by those skilled in the art from the embodiments of the present invention.

BRIEF DESCRIPTION OF THE DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

BEST MODE FOR CARRYING OUT THE INVENTION

Figure 1:
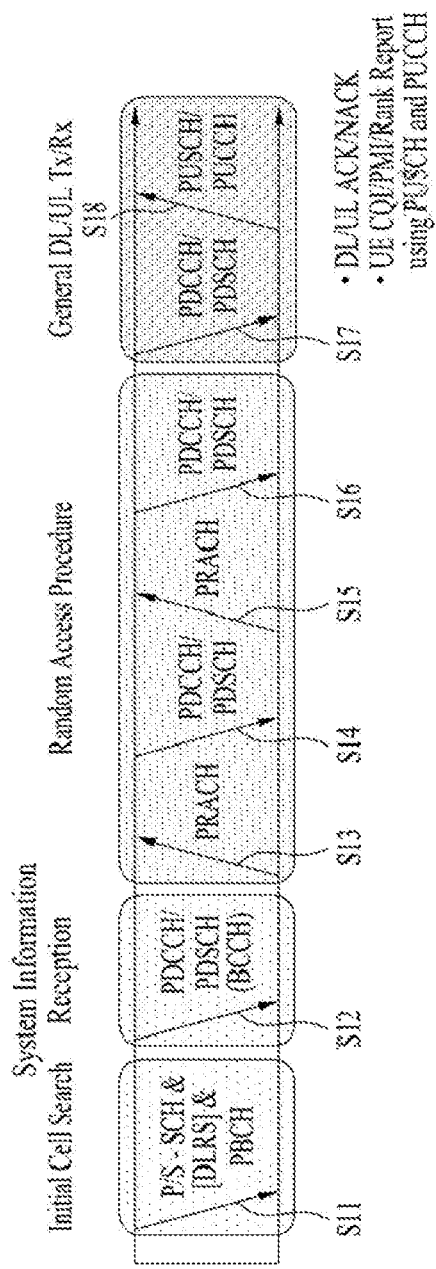
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System 1.1 Physical Channels and Signal Transmission and Reception Method Using the Physical Channels In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
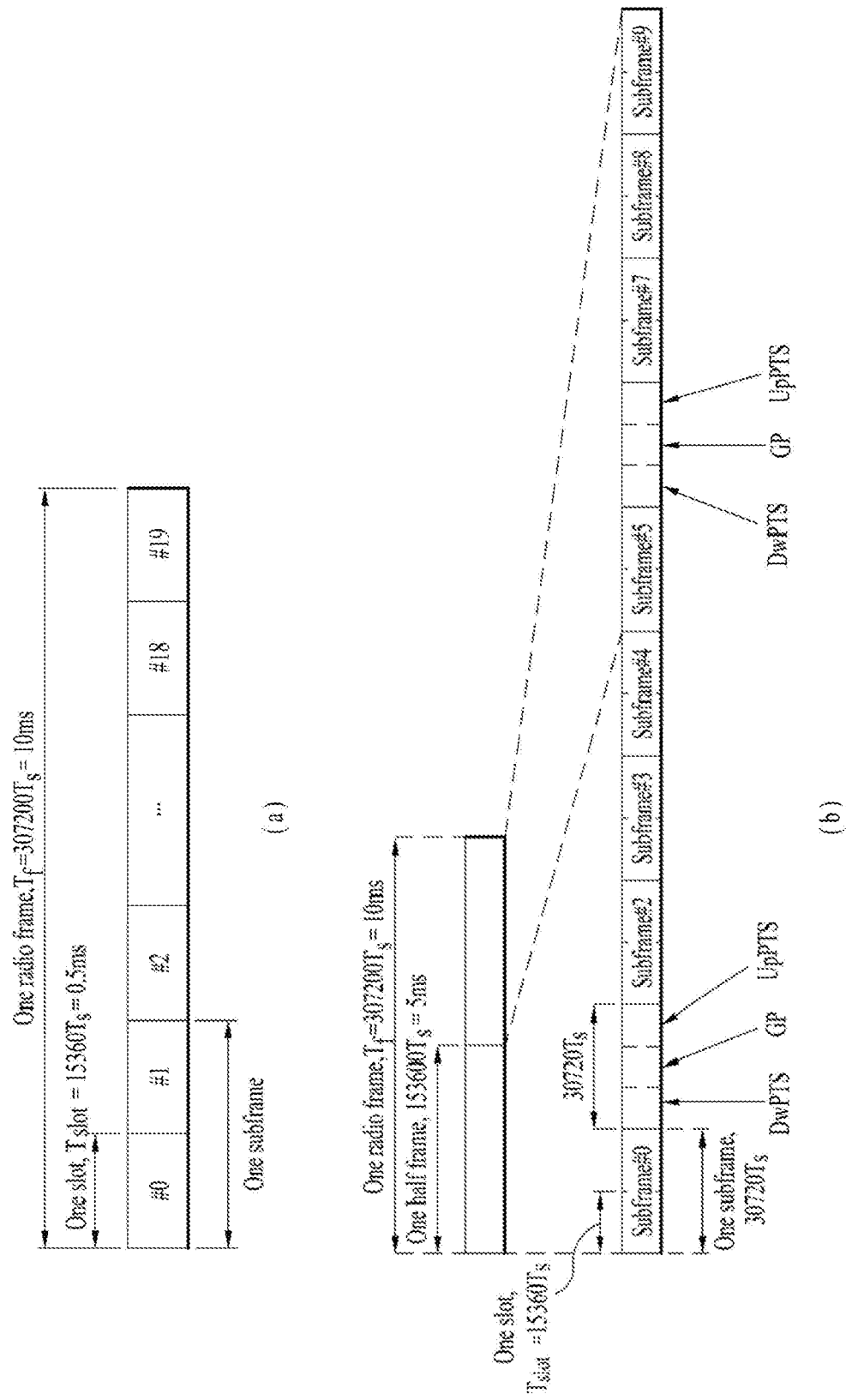
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

Table 1 below lists special subframe configurations (DwPTS/GP/UpPTS lengths).

TABLE 1

| Special Subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 3:
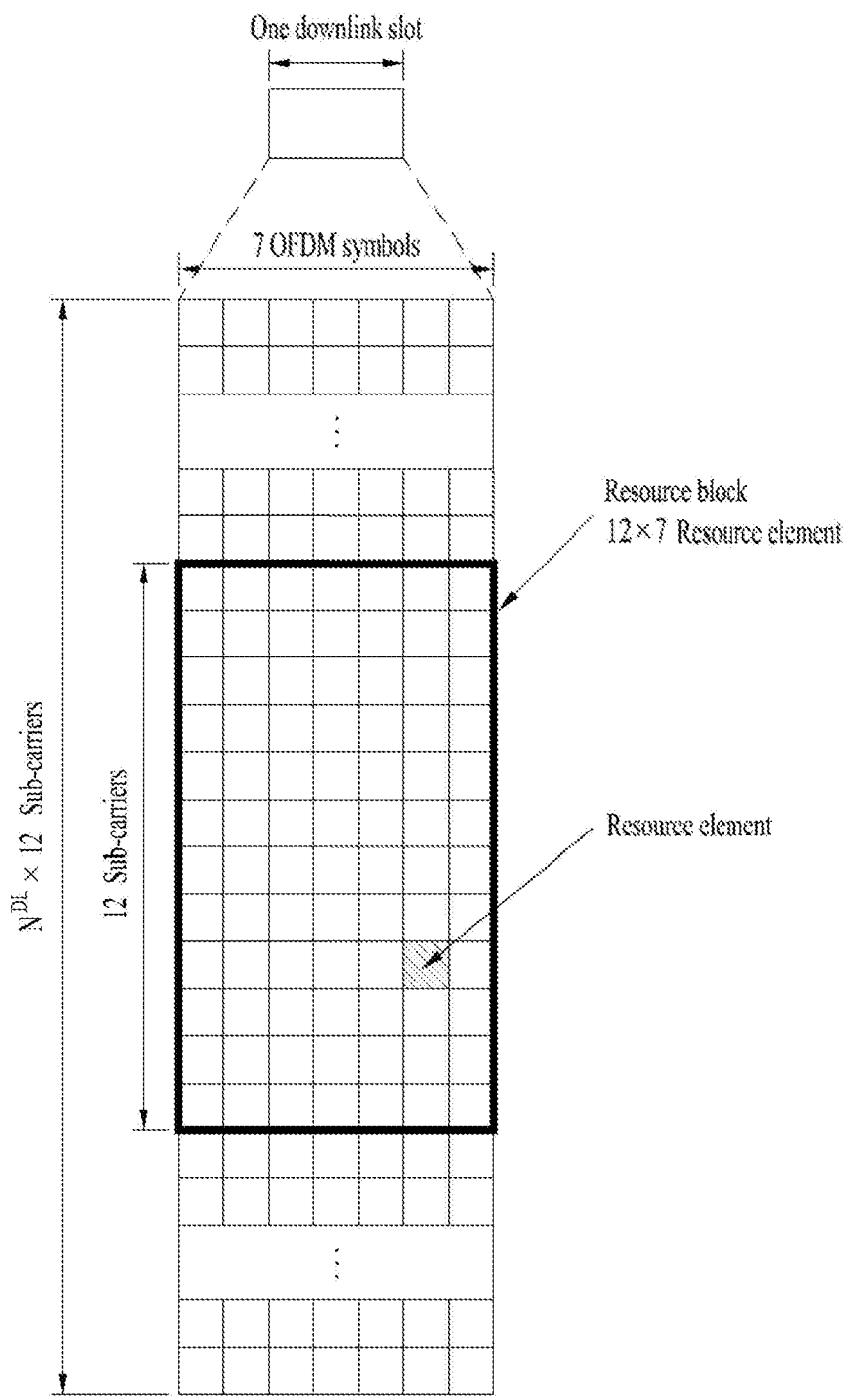
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. The structure of the uplink slot may be the same as the structure of the downlink slot.

Figure 4:
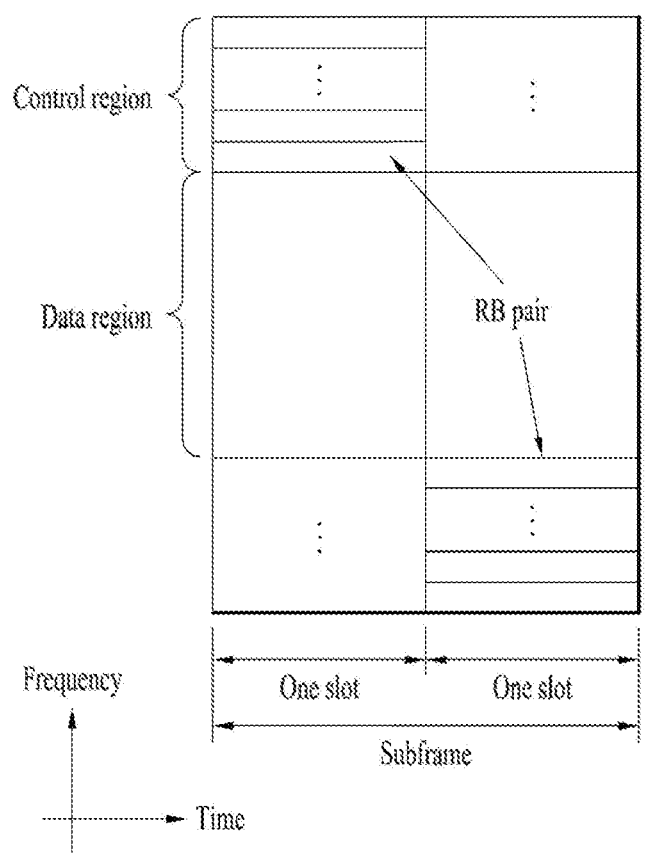
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
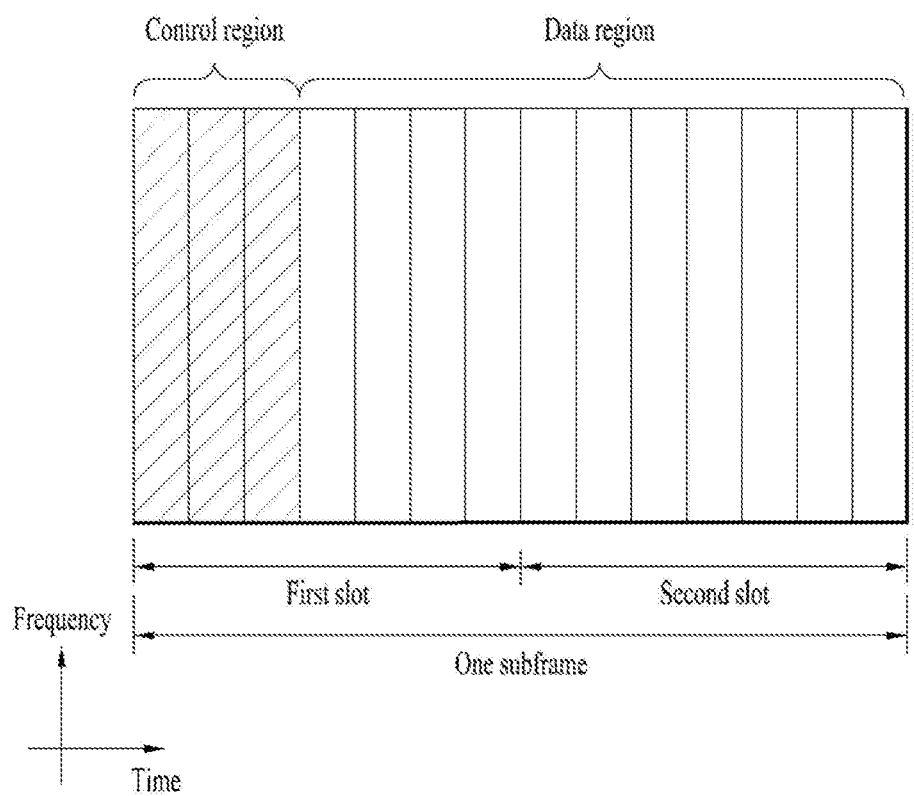
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e., the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.3. MBSFN (Multi Media Broadcast Multicast Service Single Frequency Network)

Figure 6:
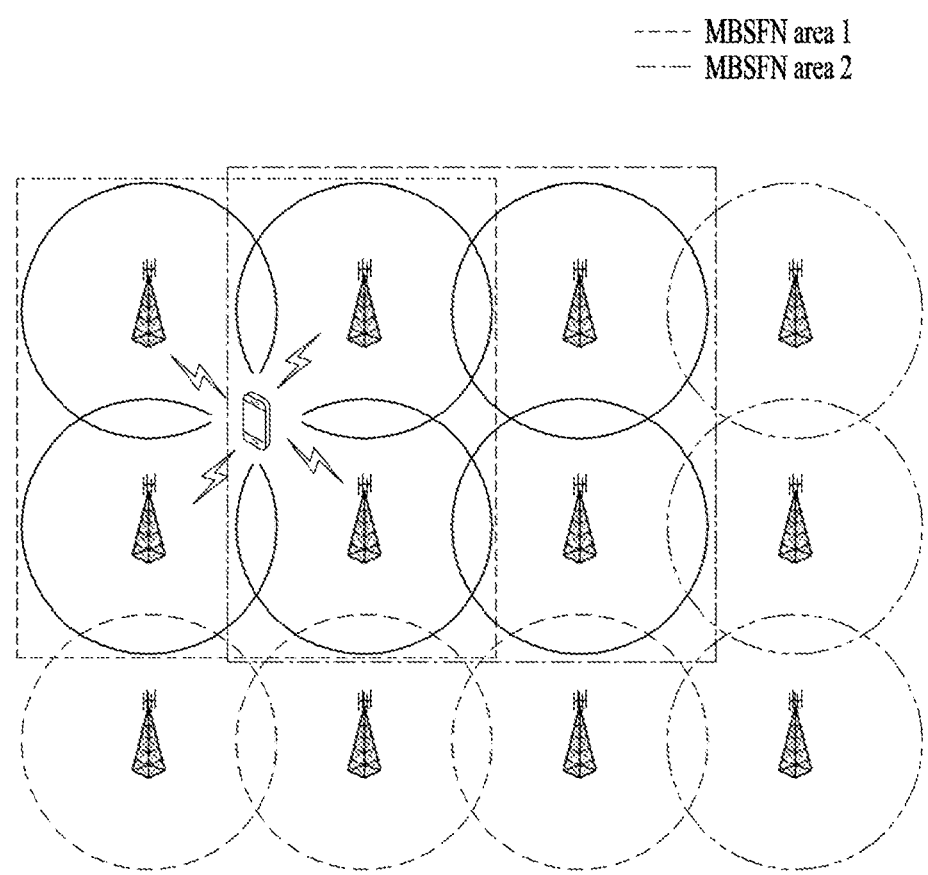
FIG. 6 is a diagram illustrating an example of MBSFN.

FIG. 6 is a diagram illustrating an example of MBSFN. The MBSFN may be used for Multimedia Broadcast Multicast Service (MBMS).

In FIG. 6, each circle denotes coverage of a corresponding transmission point (TP), wherein the TP may correspond to one base station or cell. The TP having a circle denoted by a solid line denotes synchronized TPs. A group comprised of TPs which provide the same MBMS may be formed within the synchronized TPs. This group will be referred to as MBSFN area. One or more MBSFN areas may be configured in one radio device.

In the 3GPP LTE system, MBSFN subframes are defined for MBSFN transmission. In the radio frame structure of FIG. 2, at least any one of the other subframes except subframes 0 and 5 may be configured as MBSFN subframe. This is because that the subframes 0 and 5 are used for Sync Signal (SS) transmission. This MBSFN subframe includes an extended cyclic prefix (CP), and includes 12 OFDM symbols.

First one or two OFDM symbols of the MBSFN subframe are non-MBSFN symbols and are used for TP-specific transmission, and the other OFDM symbols are used for MBSFN transmission.

In case of MBSFN transmission, a plurality of TPs transmit the same MBSFN data at MBSFN subframes which belong to the same MBSFN area. At this time, a channel to which MBSFN data are transmitted will be referred to as a Physical Multicast Channel (PMCH).

An MBSFN reference signal (RS) used for demodulation of MBSFN data is transmitted from an area of the MBSFN subframes to which the PMCH is transmitted.

Figure 7:
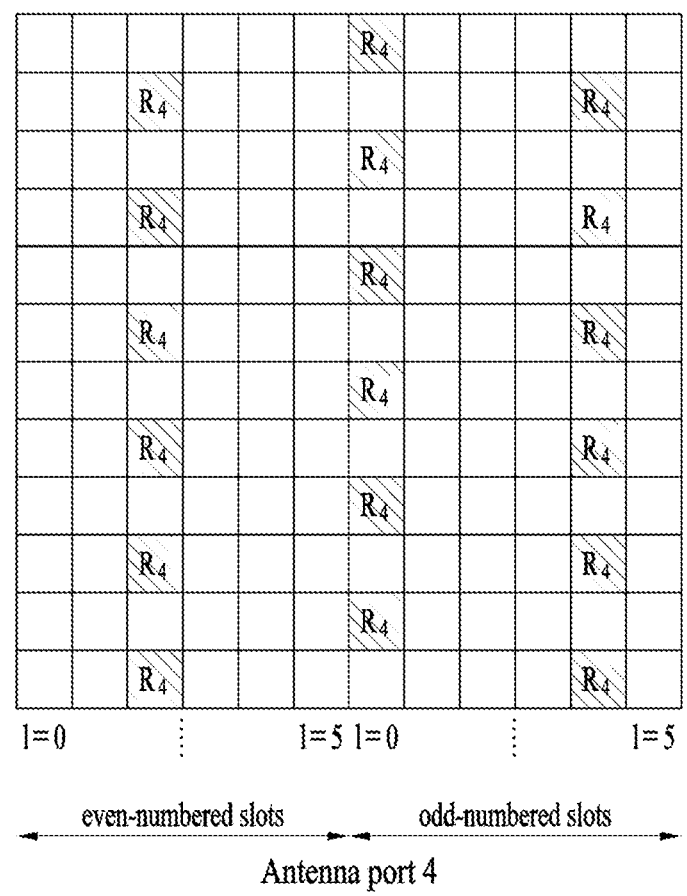
FIGS. 7 and 8 are diagrams illustrating examples of MBSFN reference signal.
Figure 8:
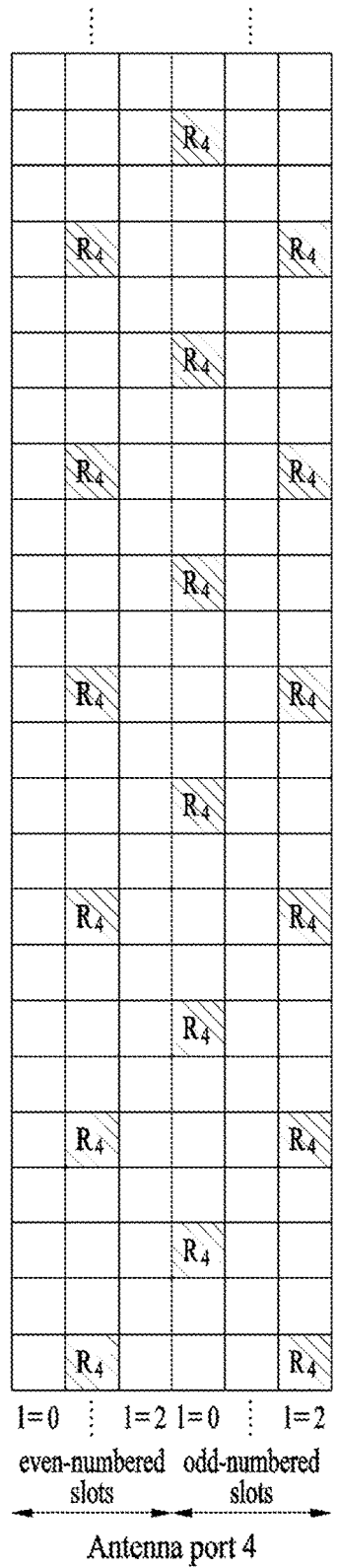

FIGS. 7 and 8 are diagrams illustrating examples of MBSFN reference signal.

The MBSFN reference signal is transmitted from the MBSFN area of the MBSFN subframe only if the PMCH is transmitted. At this time, the MBSFN reference signal is transmitted from an antenna port #4.

A sequence $r_{l,n_s}(m)$ of the MBSFN reference signal may be defined as follows.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 1]}$$

$$m = 0, 1, \ldots, 6N_{RB}^{max,DL} - 1$$

In this case, $N_{RB}^{max,DL}$ means a maximum downlink bandwidth which is configured, $n_s$ means a slot number within a radio frame, and l means an OFDM symbol number within the slot. Also, a pseudo-random sequence c(i) may be defined by a Gold sequence as follows.

$$c(n) = (x_1(n+Nc) + x_2(n+Nc)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{[Equation 2]}$$

In this case, Nc is an integer, n=0, ..., N−1, and N is a sequence length, and 'mod' denotes a modulo operation. The pseudo-random sequence may be reset at a start of each OFDM symbol like $c_{init} = 2^9 \cdot (7 \cdot (n_s+1) + l+1) \cdot (2 \cdot N_{ID}^{MBSFN} + 1) + N_{ID}^{MBSFN}$. At this time, $n_s$ is a slot number within a radio frame, and $N_{ID}^{MBSFN}$ is an MBSFN area identifier.

A signal sequence $r_{l,n_s}(m')$ on the OFDM symbol l may be mapped into complex-valued modulation symbols $a_{k,l}^{(p)}$ and an antenna port (p=4) in accordance with the following Equation.

$$a_{k,l}^{(p)} = r_{l,n_s}(m') \quad \text{[Equation 3]}$$

In this case, k, l, m, and m' may be determined by the following Equation.

$$k = \begin{cases} 2m & \text{if } l \neq 0 \text{ and } \Delta f = 15 \text{ kHz} \\ 2m+1 & \text{if } l = 0 \text{ and } \Delta f = 15 \text{ kHz} \\ 4m & \text{if } l = 0 \text{ and } \Delta f = 7.5 \text{ kHz} \\ 4m+2 & \text{if } l = 0 \text{ and } \Delta f = 7.5 \text{ kHz} \end{cases} \quad \text{[Equation 4]}$$

$$l = \begin{cases} 2 & \text{if } n_s \bmod 2 = 0 \text{ and } \Delta f = 15 \text{ kHz} \\ 0, 4 & \text{if } n_s \bmod 2 = 1 \text{ and } \Delta f = 15 \text{ kHz} \\ 1 & \text{if } n_s \bmod 2 = 0 \text{ and } \Delta f = 7.5 \text{ kHz} \\ 0, 2 & \text{if } n_s \bmod 2 = 1 \text{ and } \Delta f = 7.5 \text{ kHz} \end{cases}$$

$$m = 0, 1, \ldots, 6N_{RB}^{DL} - 1$$

$$m' = m + 3(N_{RB}^{max,DL} - N_{RB}^{DL})$$

Therefore, if the subcarrier spacing is 15 kHz, a resource element for MBSFN reference signal transmission may be represented as shown in FIG. 7. Also, if the subcarrier spacing is 7.5 kHz, a resource element for MBSFN reference signal transmission may be represented as shown in FIG. 8. At this time, $R_p$ of FIGS. 7 and 8 denotes a resource element used for reference signal transmission on the antenna port p.

2. New Radio Access Technology System

As more and more communication devices require greater communication capacity, there is a need for mobile broadband communication enhanced over existing radio access technology (RAT). In addition, massive Machine-Type Communications (MTC) capable of providing a variety of services anywhere and anytime by connecting multiple devices and objects is also considered. Communication system design considering services/UEs sensitive to reliability and latency is also under discussion.

As such, introduction of new radio access technology considering enhanced mobile broadband communication, massive MTC, and Ultra-Reliable and Low Latency Communication (URLLC) is being discussed. In the present invention, for simplicity, this technology will be referred to as New RAT or NR (New Radio).

2.1. Self-Contained Subframe Structure

Figure 9:
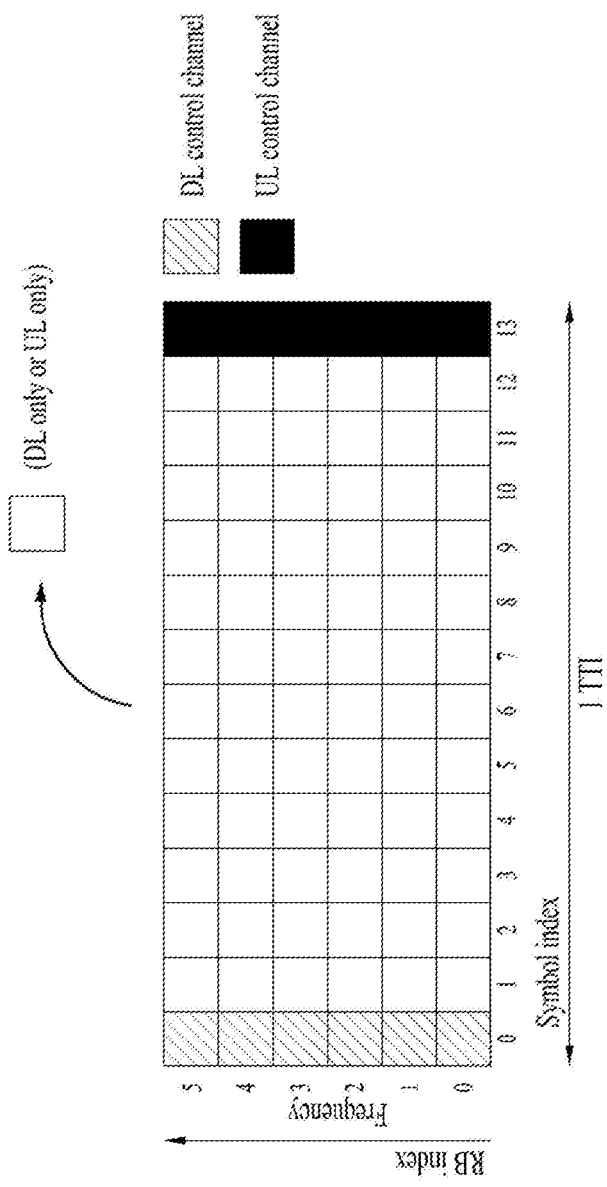
FIG. 9 is a diagram illustrating a self-contained subframe structure applicable to the present invention.

FIG. 9 is a diagram illustrating a self-contained subframe structure applicable to the present invention.

In the NR system to which the present invention is applicable, a self-contained subframe structure as shown in FIG. 9 is proposed in order to minimize data transmission latency in the TDD system.

In FIG. 9, the hatched region (e.g., symbol index=0) represents a downlink control region, and the black region (e.g., symbol index=13) represents an uplink control region. The other region (e.g., symbol index=1 to 12) may be used for downlink data transmission or for uplink data transmission.

In this structure, DL transmission and UL transmission may be sequentially performed in one subframe. In addition, DL data may be transmitted and received in one subframe and UL ACK/NACK therefor may be transmitted and received in the same subframe. As a result, this structure may reduce time taken to retransmit data when a data transmission error occurs, thereby minimizing the latency of final data transmission.

In such a self-contained subframe structure, a time gap having a certain temporal length is required in order for the base station and the UE to switch from the transmission mode to the reception mode or from the reception mode to the transmission mode. To this end, some OFDM symbols at the time of switching from DL to UL in the self-contained subframe structure may be set as a guard period (GP).

While a case where the self-contained subframe structure includes both the DL control region and the UL control region has been described above, the control regions may be selectively included in the self-contained subframe structure. In other words, the self-contained subframe structure according to the present invention may include not only the case of including both the DL control region and the UL control region but also the case of including either the DL control region or the UL control region alone, as shown in FIG. 9.

For simplicity of explanation, the frame structure configured as above is referred to as a subframe, but this configuration can also be referred to as a frame or a slot. For example, in the NR system, one unit consisting of a plurality of symbols may be referred to as a slot. In the following description, a subframe or a frame may be replaced with the slot described above.

2.2. OFDM Numerology

The NR system uses the OFDM transmission scheme or a similar transmission scheme. Here, the NR system may typically have the OFDM numerology as shown in Table 2.

TABLE 2

| Parameter | Value |
|---|---|
| Subcarrier-spacing ($\Delta f$) | 75 kHz |
| OFDM symbol length | 13.33 μs |
| Cyclic Prefix (CP) length | 1.04 μs/0.94 μs |
| System BW | 100 MHz |
| No. of available subcarriers | 1200 |
| Subframe length | 0.2 ms |
| Number of OFDM symbol per Subframe | 14 symbols |

Alternatively, the NR system may use the OFDM transmission scheme or a similar transmission scheme, and may use an OFDM numerology selected from among multiple OFDM numerologies as shown in Table 3. Specifically, as disclosed in Table 3, the NR system may take the 15 kHz subcarrier-spacing used in the LTE system as a base, and use an OFDM numerology having subcarrier-spacing of 30, 60, and 120 kHz, which are multiples of the 15 kHz subcarrier-spacing.

In this case, the cyclic prefix, the system bandwidth (BW) and the number of available subcarriers disclosed in Table 3 are merely an example that is applicable to the NR system according to the present invention, and the values thereof may depend on the implementation method. Typically, for the 60 kHz subcarrier-spacing, the system bandwidth may be set to 100 MHz. In this case, the number of available subcarriers may be greater than 1500 and less than 1666. Also, the subframe length and the number of OFDM symbols per subframe disclosed in Table 3 are merely an example that is applicable to the NR system according to the present invention, and the values thereof may depend on the implementation method.

TABLE 3

| Parameter | Value | Value | Value | Value |
|---|---|---|---|---|
| Subcarrier-spacing ($\Delta f$) | 15 kHz | 30 kHz | 60 kHz | 120 kHz |
| OFDM symbol length | 66.66 | 33.33 | 16.66 | 8.33 |
| Cyclic Prefix(CP) length | 5.20 μs/4.69 μs | 2.60 μs/2.34 μs | 1.30 μs/1.17 μs | 0.65 μs/0.59 μs |
| System BW | 20 MHz | 40 MHz | 80 MHz | 160 MHz |
| No. of available subcarriers | 1200 | 1200 | 1200 | 1200 |

TABLE 3-continued

| Parameter | Value | Value | Value | Value |
|---|---|---|---|---|
| Subframe length | 1 ms | 0.5 ms | 0.25 ms | 0.125 ms |
| Number of OFDM symbol per Subframe | 14 symbols | 14 symbols | 14 symbols | 14 symbols |

2.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 10:
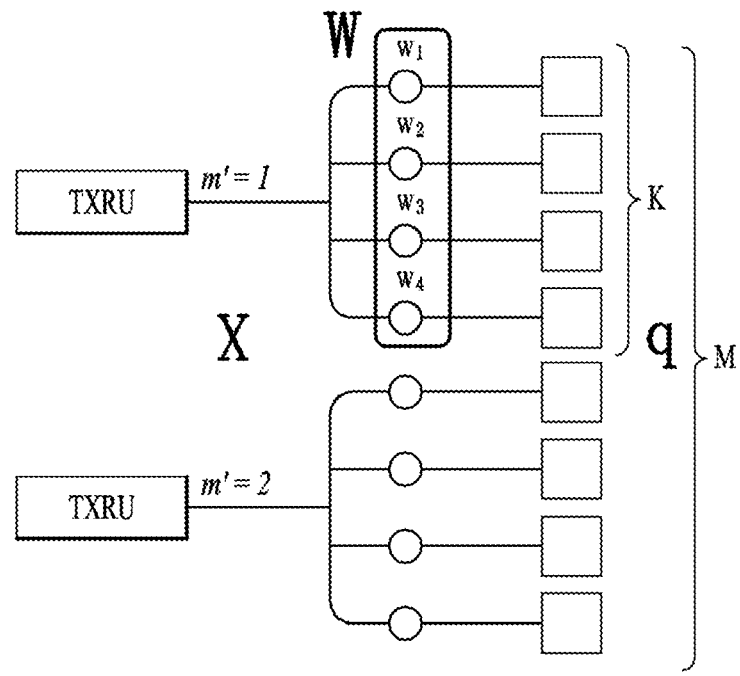
FIGS. 10 and 11 are diagrams illustrating representative connection methods for connecting TXRUs to antenna elements.
Figure 11:
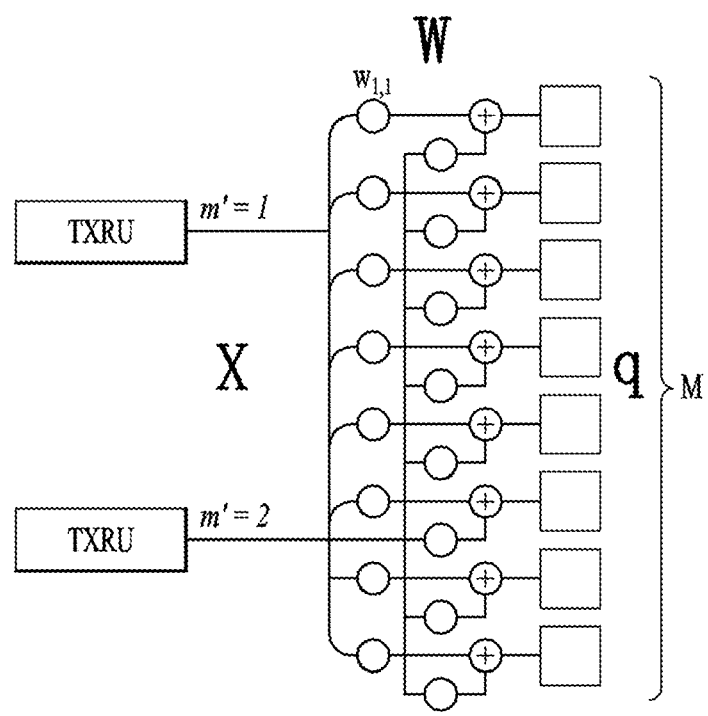

FIGS. 10 and 11 are diagrams illustrating representative methods for connecting TXRUs to antenna elements. Here, the TXRU virtualization model represents the relationship between TXRU output signals and antenna element output signals.

FIG. 10 shows a method for connecting TXRUs to sub-arrays. In FIG. 10, one antenna element is connected to one TXRU.

Meanwhile, FIG. 11 shows a method for connecting all TXRUs to all antenna elements. In FIG. 11, all antenna element are connected to all TXRUs. In this case, separate addition units are required to connect all antenna elements to all TXRUs as shown in FIG. 11.

In FIGS. 10 and 11, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 10 has a disadvantage in that it is difficult to achieve beamforming focusing but has an advantage in that all antennas can be configured at low cost.

On the contrary, the configuration shown in FIG. 11 is advantageous in that beamforming focusing can be easily achieved. However, since all antenna elements are connected to the TXRU, it has a disadvantage of high cost.

3. Proposed Embodiment

Based on the technical configuration described as above, the present invention proposes a method for solving a problem of carrier frequency offset (CFO) acquisition and tracking in view of a receiver if a subcarrier spacing within one unit time (e.g., subframe) is rapidly changed (e.g., change from 15 kHz to 3.75 kHz). As an example, the present invention proposes a method for designing and transmitting a reference signal (and a separate preamble signal (e.g., synchronization signal)) to solve a problem of CFO acquisition and tracking in view of MBMS reception, which occurs when a unicast service and MBMS based on MBSFN are to be dynamically transmitted within one subframe.

The MBSFN applicable to the present invention includes a configuration in which a plurality of synchronized cells simultaneously transmit the same MBMS data in a specific area. The specific area is referred to as an MBSFN area.

In view of the receiver which receives MBMS data in the MBSFN area, the same signal is received with a multipath delay, whereby a maximum path delay difference is determined by an inter-site distance (ISD) between transmitters. This MBSFN operation is advantageous in view of a received signal strength, an interference level, and a multipath diversity gain, as compared with unicast.

To maintain orthogonality between subcarriers in the MBSFN operation, a cyclic prefix (CP) which may include a maximum path delay difference by ISD should be used. Therefore, in the present invention, as a method for increasing a CP length to support MBSFN (Large MBSFN) which supports a cell size greater than a basic (NR/LTE) cell radius, three methods may be considered as follows.

(1) A subcarrier spacing (SCS) is reduced.
(2) SCS is maintained as it is, and a radio of CP to a useful symbol duration is increased.
(3) The aforementioned methods (1) and (2) are applied.

If MBSFN is applied within an NR framework to which the present invention is applicable, the receiver should be able to receive MBMS signal after acquiring MBSFN related remote resource control (RRC) information through unicast. In this case, the receiver should be able to receive MBSFN chunk (e.g., time/frequency resource area where MBSFN is transmitted) or MBSFN OFDM symbol having a tiny SCS on the basis of frequency information acquired from unicast OFDM symbol having a large SCS.

Alternatively, like the general configuration of the present invention, a case that another service which requires a tiny SCS like MBSFN even in case of no MBSFN is to be supported within the same subframe may occur. For example, if SCS1 is defined as SCS used for unicast transmission and SCS2 is defined as SCS used for MBSFN or another service transmission, (at this time, SCS1>>SCS2), a residual error of frequency offset acquired using SCS1 may be out of a pull-in range in view of SCS2.

In this case, it may be difficult to perform carrier frequency pull-in by only the legacy LTE MBSFN RS design scheme or receive MBSFN data due to a residual frequency error.

As methods for solving this problem, the present invention proposes two methods as follows.

(1) First method: MBSFN RS design for frequency acquisition and tracking performance reinforcement.

In this case, the MBSFN RS may be applied as follows.

As the MBSFN RS, a tracking RS for another numerology, which is transmitted by a cell regardless of the MBMS, may be used. At this time, the numerology of the tracking RS may not be coincident with the MBMS numerology necessarily. For example, a normal CP not the extended CP may be applied to the tracking RS, or a subcarrier spacing greater than or smaller than that of the MBMS numerology may be applied thereto. In this way, the MBSFN RS may be transmitted as one dedicated for the MBMS, or may be shared with another usage scenario. In transmission of this RS (including MBSFN RS), period, transmission time and frequency may be configured by higher layer signaling. Also, this RS may be transmitted from an area (e.g., resource area to which other service or different numerologies are applied) not the MBMS area.

Also, common ID not ID of a specific MBSFN area may be used as MBSFN ID applied to the MBSFN RS. For example, the common ID may be cell ID or ID configured by a specific higher layer. This RS may be transmitted separately from the MBMS area per MBSFN area or its resource area (e.g., time/frequency resource) may be configured separately.

(2) Second method: MBSFN SS (sync signal) or preamble signal is transmitted to a start part of the MBSFN.

In this case, the MBSFN SS (or MBSFN preamble signal, hereinafter, commonly referred to as MBSFN SS for convenience of description) may be applied as follows.

As the MBSFN SS, a tracking RS for another numerology, which is transmitted by a cell regardless of the MBMS, may be used. At this time, the numerology of the tracking SS may not be coincident with the MBMS numerology necessarily. For example, a normal CP not the extended CP may be applied to the tracking SS, or a subcarrier spacing greater than or smaller than that of the MBMS numerology may be applied thereto. In this way, in transmission of this SS (including MBSFN SS), period, transmission time and frequency may be configured by higher layer signaling. Characteristically, this SS may be transmitted even from an area not the MBMS area.

Also, common ID not ID of a specific MBSFN area may be used as MBSFN ID applied to the MBSFN RS. For example, the common ID may be cell ID or ID configured by a specific higher layer. This RS may be transmitted separately from the MBMS area per MBSFN area or its resource area (e.g., time/frequency resource) may be configured separately.

Also, common ID not ID of a specific MBSFN area may be used as MBSFN ID applied to the MBSFN SS. For example, the common ID may be cell ID or ID configured by a specific higher layer. This SS may be transmitted separately from the MBMS area per MBSFN area or its resource area (e.g., time/frequency resource) may be configured separately.

Additionally, the present invention may include RS (and SS) transmission method according to a third method and a fourth method to which the first method and the second method are respectively applied with respect to a plurality of subframes.

As described above, the signal transmission and reception method according to the present invention may be applied to all signal transmission and reception methods when a change level of a subcarrier spacing applied between two adjacent symbols is great (e.g., when a subcarrier spacing is reduced to ¼ or less along a time domain).

Therefore, for convenience of description, the configuration according to the present invention will be described based on the RS (and SS) transmission method for providing MBSFN service, but the corresponding configuration may be applied to another signal transmission and reception system (e.g., unicast signal transmission and reception) not the MBSFN service providing system.

In more detail, first of all, a basic MBSFN RS arrangement structure proposed in the present invention will be described in detail, and a characteristic MBSFN RS (and MBSFN SS) arrangement structure proposed in the present invention will be described in detail based on the MBSFN RS arrangement structure.

Figure 12:
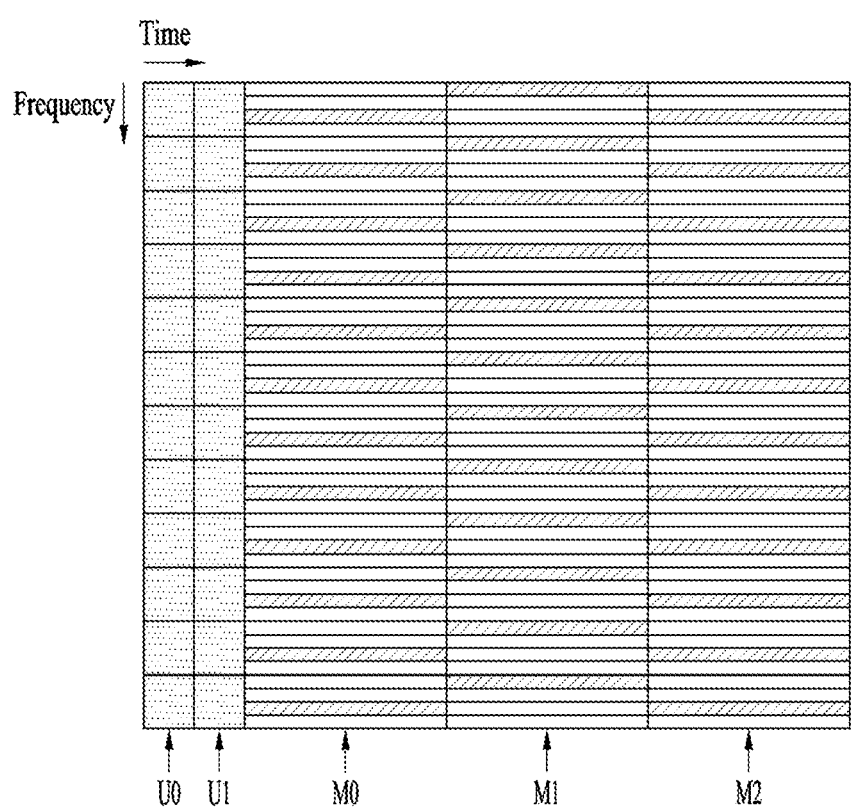
FIG. 12 is a diagram illustrating a basic MBSFN RS arrangement structure applicable to the present invention.

FIG. 12 is a diagram illustrating a basic MBSFN RS arrangement structure applicable to the present invention.

In FIG. 12, U0 and U1 mean unicast OFDM symbols having SCS1, and M0, M1, and M2 mean MBSFN OFDM symbols having SCS2. Also, a hatched area within the MBSFN OFDM symbols means a resource area to which the MBSFN RS is transmitted. Also, in FIG. 12, a row means a frequency dimension (e.g., subcarrier spacing), and a column means a time dimension (e.g., OFDM symbol spacing).

FIG. 12 illustrates an example of SCS2=¼*SCS 1, and illustrates that two unicast OFDM symbols (e.g., U0 and U1) and three MBSFN OFDM symbols (e.g., M0, M1 and M2) configure one subframe. In other words, FIG. 12 illustrates that the MBSFN RS is transmitted per MBSFN symbol such that the MBSFN RS is transmitted at a time spacing the same as that of the unicast RS (or similar Doppler throughput is supported).

Additionally, the configuration of the present invention may be applied to even the case that the RS is transmitted from only spaced symbols at a spacing of a plurality of OFDM symbols.

Hereinafter, the methods proposed in the present invention will be described in detail. In this case, as detailed examples of the configuration applicable to the present invention, the MBSFN RS and the MBSFN SS are proposed. This is only for convenience of description, and the corresponding configuration may be extended to a general RS or SS. In other words, the person skilled in the art to which the present invention pertains may easily devise that the MBSFN structure proposed in the present invention may be extended to another structure.

3.1. First Method 3.1.1. 1-1th Method

Figure 13:
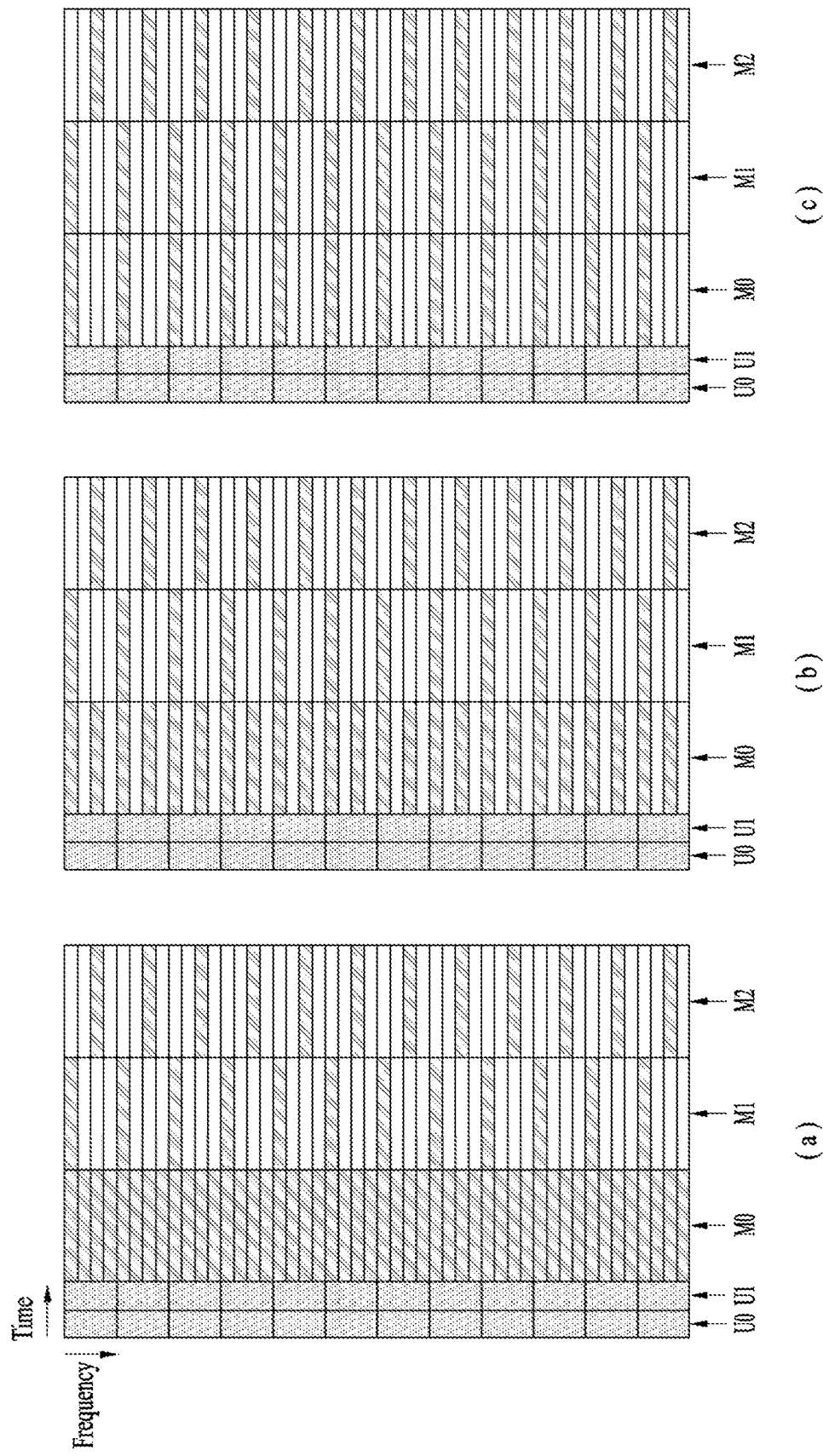
FIG. 13 is a diagram simply illustrating RS transmission method according to the 1-1th method proposed in the present invention.

FIG. 13 is a diagram simply illustrating RS transmission method according to the 1-1th method proposed in the present invention.

As shown in FIG. 13, a frequency resource to which the RS is transmitted from a first symbol (e.g., M0) where a subcarrier spacing is rapidly reduced in a time dimension may include a frequency resource to which the RS is transmitted from a second symbol (e.g., M1). In this way, according to the 1-1th method of the present invention, the RS may be reinforced in the first (MBSFN) OFDM symbol (e.g., M0) where the subcarrier spacing is rapidly reduced.

In more detail, a method for designing the first symbol to be operated as a sync signal (SS) having the same SCS as that of the MBSFN by allowing the RS to be transmitted per subcarrier within the first symbol (e.g., M0) is shown in FIG. 13(*a*).

However, the design configuration in FIG. 13(*a*) may not be useful in view of RS overhead. Therefore, as shown in FIG. 13(*b*) or (*c*), RS overhead may be reduced by controlling a frequency of a subcarrier to which the RS is transmitted from the first symbol.

In this way, in comparison between the RS configurations in FIGS. 12 and 13, the RS configuration of FIG. 13 is different from the RS configuration of FIG. 12 in that the RS is arranged at the same subcarrier position of the first and second OFDM symbols (e.g., M0 and MD where the subcarrier spacing is rapidly reduced. As a result, the receiver may estimate and correct a frequency error based on that the RSs of the two symbols (e.g., M0 and M1) are continuously positioned on the same frequency. In other words, the receiver may estimate and correct a residual frequency error, whereby data of initial (MBSFN) OFDM symbol (e.g., M0) may be received reliably.

Figure 14:
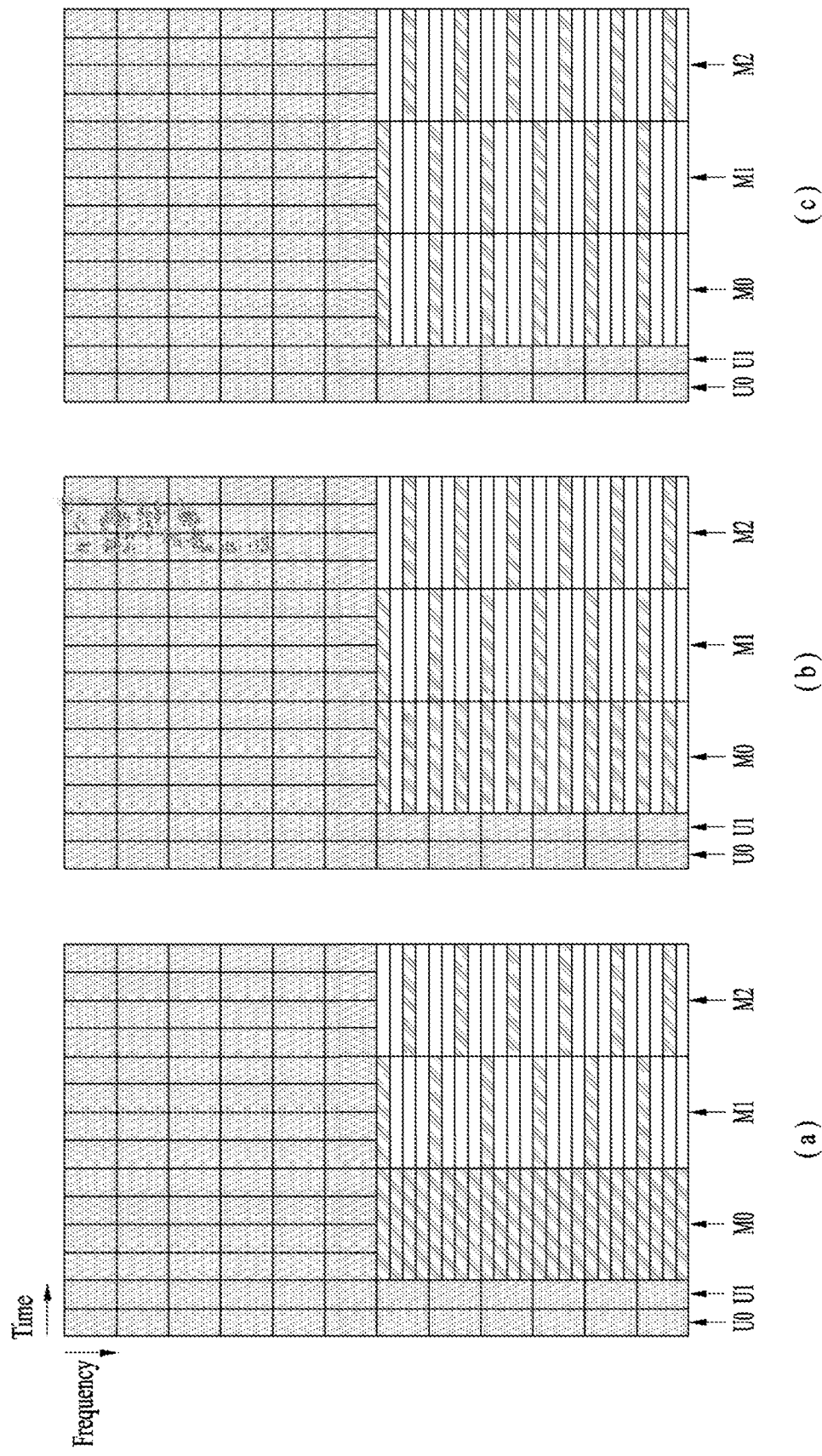
FIG. 14 is a diagram simply illustrating an extended example of RS transmission method according to the 1-1th method proposed in the present invention.

FIG. 14 is a diagram simply illustrating an extended example of RS transmission method according to the 1-1th method proposed in the present invention.

As shown in FIG. 14, the RS transmission configuration shown in FIG. 13 may coexist with unicast transmission in a Frequency Division Multiplexing (FDM) scheme. In other words, two kinds of subcarrier spacing exist for a frequency band to which RS subjected to FDM is transmitted, whereas only one subcarrier spacing may exist for a frequency band (e.g., frequency band where unicast transmission is performed) to which RS subjected to FDM is not transmitted.

Alternatively, a subcarrier spacing, which is different from that of resource areas (e.g., U0 and U1) where the unicast transmission is performed and that of resource areas (e.g., M0, M1 and M2) to which the RS is transmitted, may be applied to the resource area to which the RS is not transmitted. Therefore, two kinds of subcarrier spacing may exist for the frequency band to which the RS is not transmitted, but may be different from the subcarrier spacing applied to the resource area to which the RS is transmitted.

3.1.2. 1-2th Method

Figure 15:
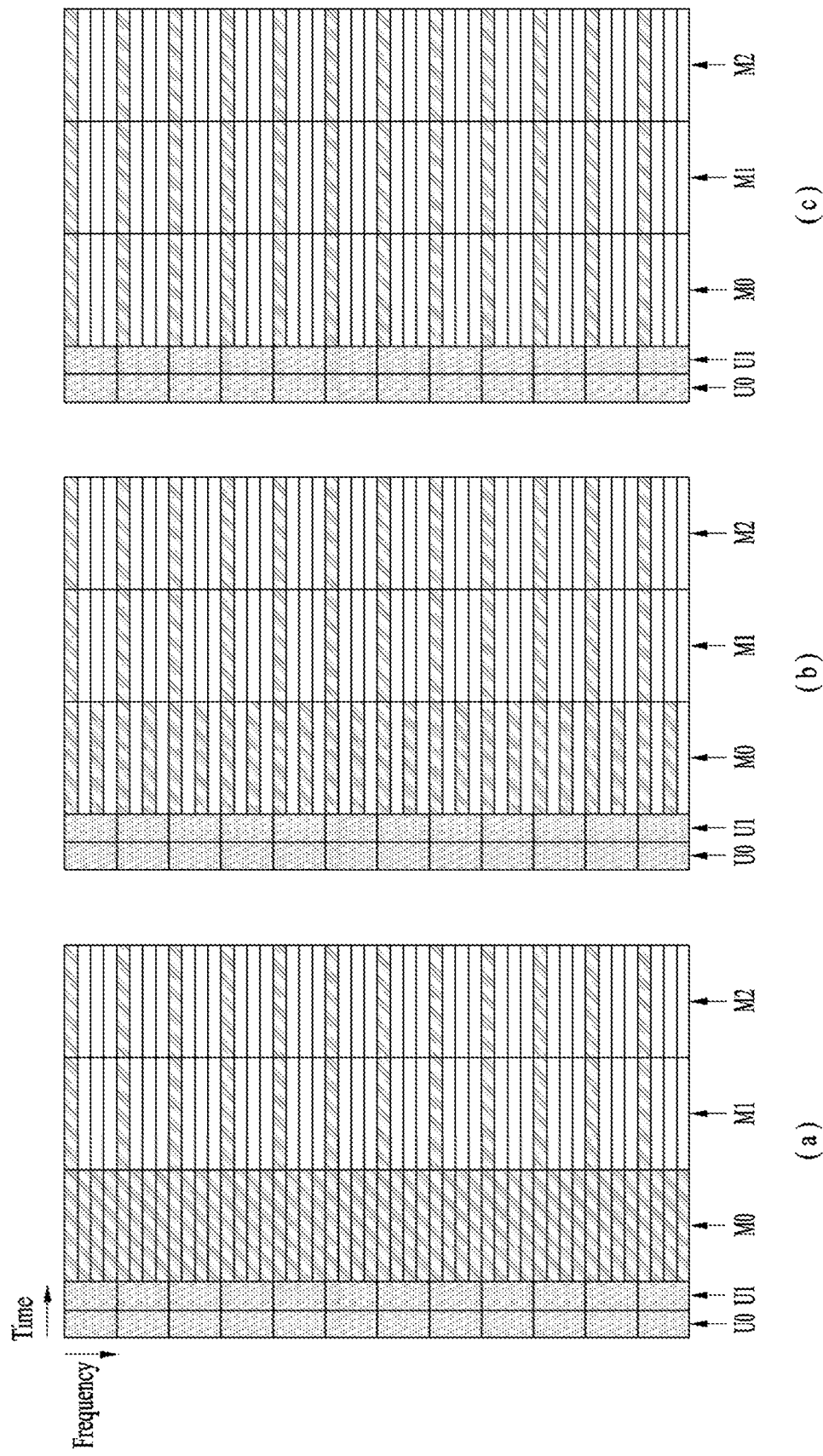
FIG. 15 is a diagram simply illustrating RS transmission method according to the 1-2th method proposed in the present invention.

FIG. 15 is a diagram simply illustrating RS transmission method according to the 1-2th method proposed in the present invention.

As shown in FIG. 15, a frequency resource to which the RS is transmitted from a first symbol (e.g., M0) where a subcarrier spacing is rapidly reduced in a time dimension may include a frequency resource to which the RS is transmitted from a second symbol (e.g., M1) and a third symbol (e.g., M2). At this time, the frequency resources to which the RS is transmitted from the second symbol and the third symbol may be configured equally. In this way, according to the 1-2th method of the present invention in the same manner as the 1-1th method, the RS may be reinforced in the first (MBSFN) OFDM symbol (e.g., M0) where the subcarrier spacing is rapidly reduced.

Characteristically, in the 1-2th method of the present invention, the frequency position of the RS is configured equally in at least three symbols (e.g., M0, M1 and M2) as compared with the 1-1th method. At this time, this configuration may include that the frequency position where the RS is arranged is configured equally for one unit time (e.g., subframe).

This configuration may be advantageous in that frequency and time tracking may be performed more easily than the 1-1th method. However, when considering channel estimation based on time interpolation of the 1-1th method, the 1-2th method has a problem in that RS overhead is increased in the second and third symbols (e.g., M1 and M2) as compared with the 1-1th method to the same support maximum delay spread.

Also, the design configuration in FIG. 15(*a*) may not be useful in view of RS overhead. Therefore, as shown in FIG. 15(*b*) or (*c*), RS overhead may be reduced by controlling a frequency of a subcarrier to which the RS is transmitted from the first symbol.

Figure 16:
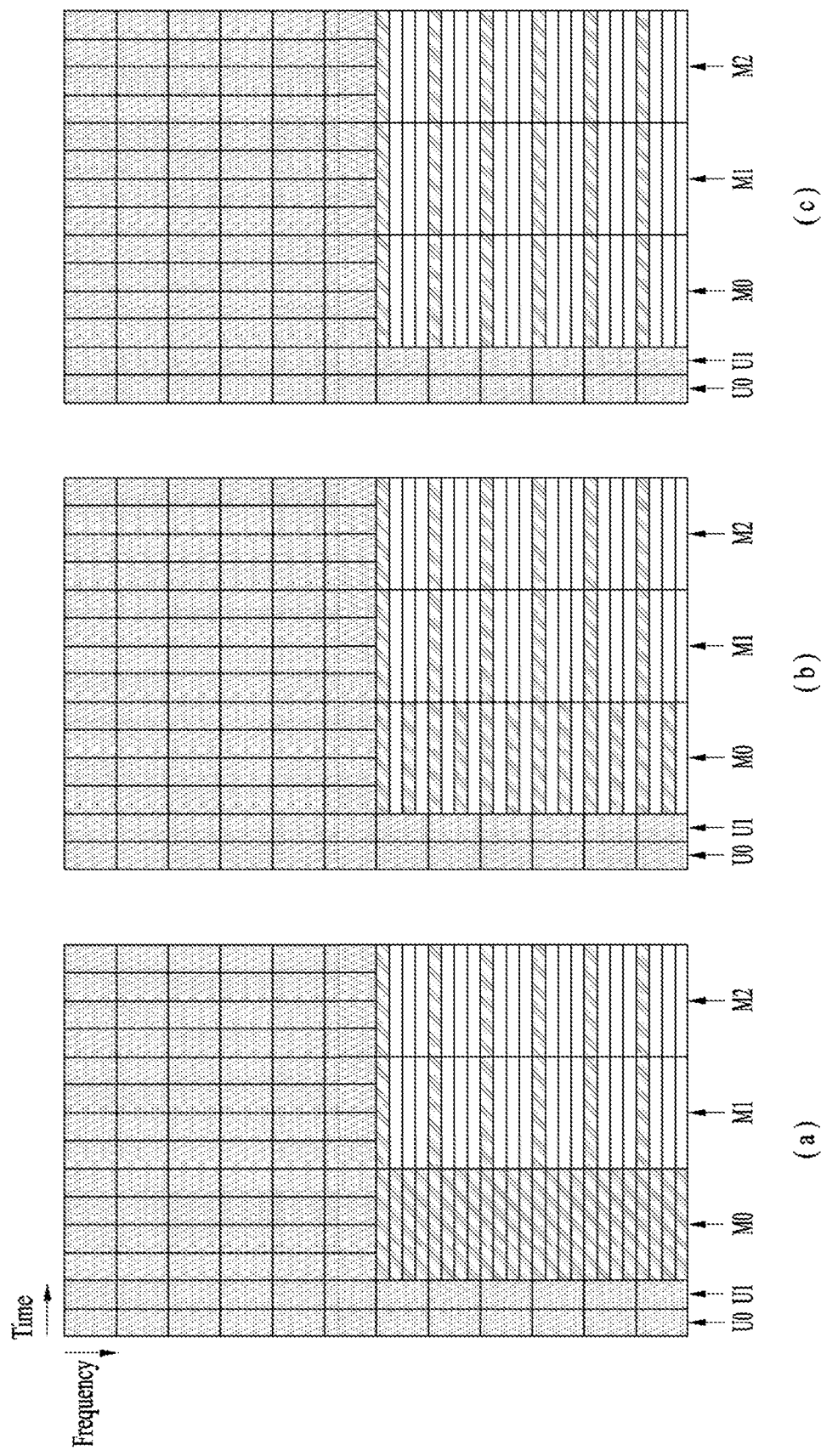
FIG. 16 is a diagram simply illustrating an extended example of RS transmission method according to the 1-2th method proposed in the present invention.

FIG. 16 is a diagram simply illustrating an extended example of RS transmission method according to the 1-2th method proposed in the present invention.

As shown in FIG. 16, the RS transmission configuration shown in FIG. 15 may coexist with unicast transmission in a Frequency Division Multiplexing (FDM) scheme. In other words, two kinds of subcarrier spacing exist for a frequency band to which RS subjected to FDM is transmitted, whereas only one subcarrier spacing may exist for a frequency band (e.g., frequency band where unicast transmission is performed) to which RS subjected to FDM is not transmitted.

Alternatively, a subcarrier spacing, which is different from that of a resource area (e.g., U0 and U1) where the unicast transmission is performed and that of a resource area (e.g., M0, M1 and M2) to which the RS is transmitted, may be applied to the resource area to which the RS is not transmitted. Therefore, two kinds of subcarrier spacing may exist for the frequency band to which the RS is not transmitted, but may be different from the subcarrier spacing applied to the resource area to which the RS is transmitted.

3.1.3. 1-3th Method

The case that the (MBSFN) RS is transmitted per (MBSFN) symbol on the assumption that the (MBSFN) RS is transmitted at a time spacing the same as that of the unicast RS (or similar Doppler throughput is supported) has been described as above.

However, the 1-3th method and the 1-4th method according to the present invention disclose a case that the (MBSFN) RS is not transmitted per symbol to reduce RS overhead. In other words, according to the 1-3th method and the 1-4th method, the (MBSFN) RS is transmitted from some of the (MBSFN) OFDM symbols but the (MBSFN) RS may not be transmitted from the other some of the (MBSFN) OFDM symbols.

FIGS. 17 to 20 are diagrams simply illustrating RS transmission method according to the 1-3th method proposed in the present invention.

Figure 17:
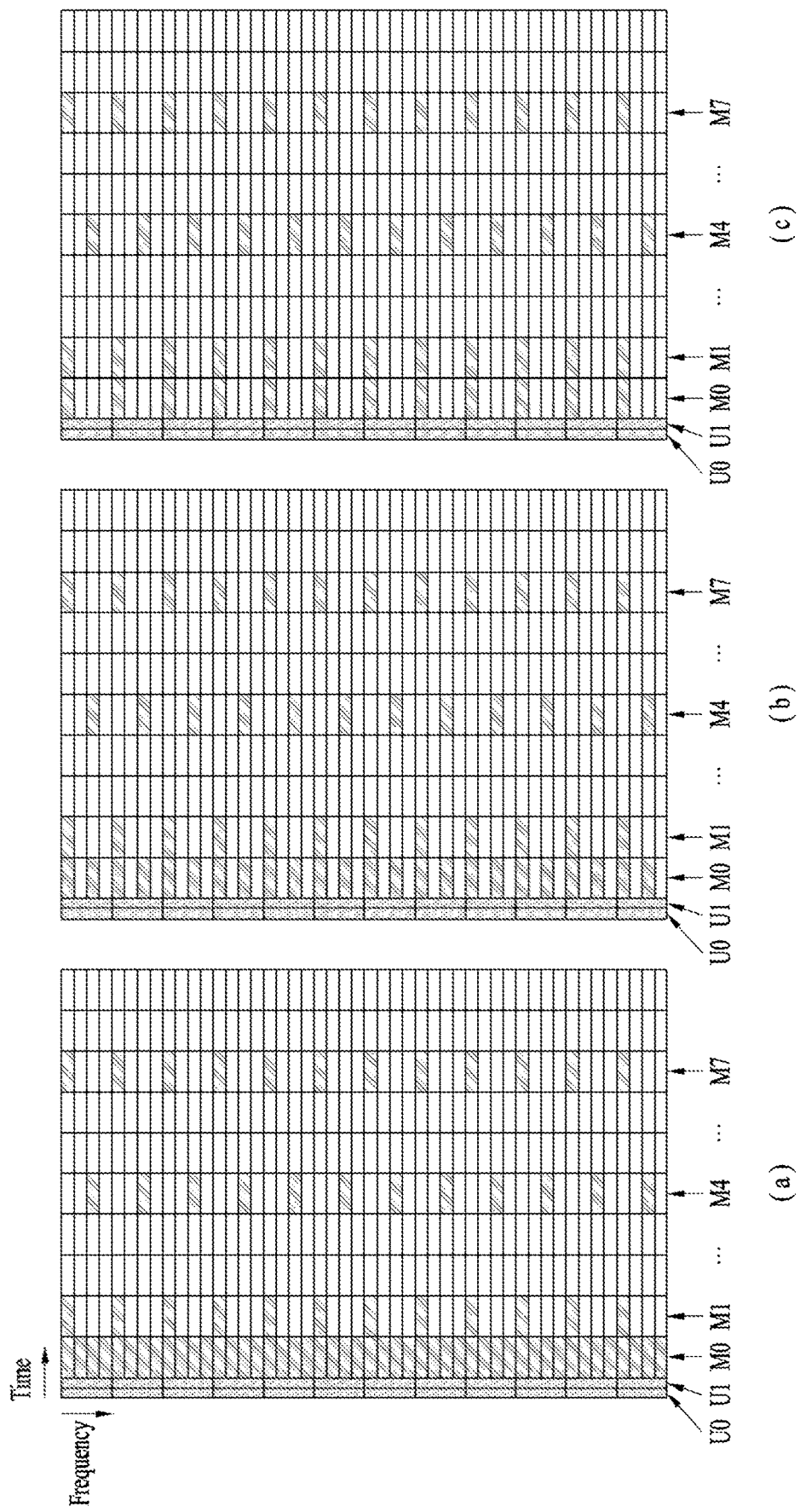
FIGS. 17 to 20 are diagrams simply illustrating RS transmission method according to the 1-3th method proposed in the present invention.

First of all, as shown in FIG. 17, a frequency resource to which the RS is transmitted from a first symbol (e.g., M0) where a subcarrier spacing is rapidly reduced in a time dimension may include a frequency resource to which the RS is transmitted from a second symbol (e.g., M1) which is next symbol of the first symbol. At this time, the RS may be transmitted through symbols spaced at a spacing of two symbols from the second symbol (e.g., M1).

As a detailed example, the RS may be transmitted from all frequency resources within the first symbol (e.g., M0) as shown in FIG. 17(*a*), or may be transmitted from only some frequency resource within the first symbol as shown in FIGS. 17(*b*) and (*c*). As a result, RS overhead may be reduced.

Figure 18:
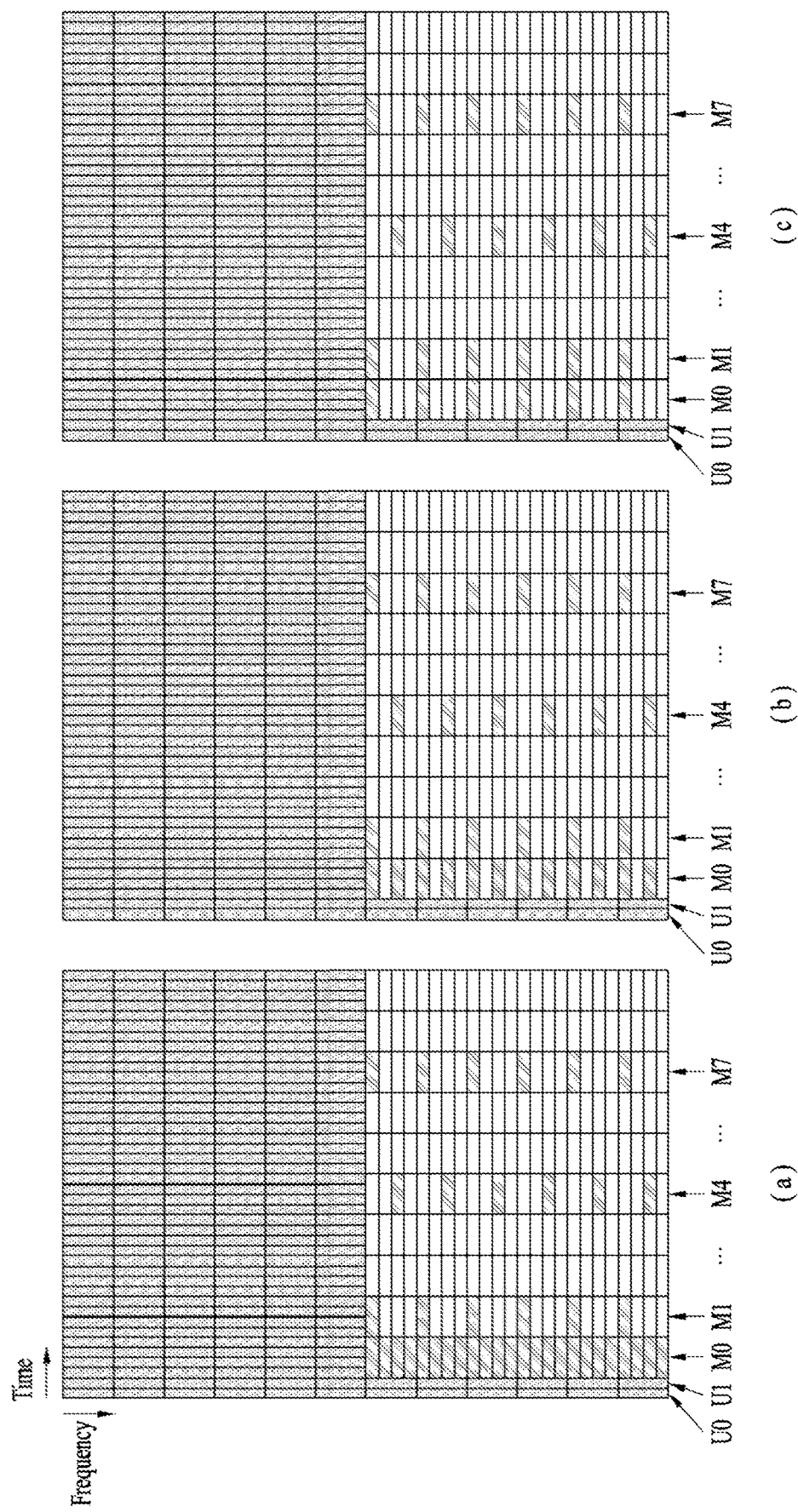

Also, as shown in FIG. 18, the RS transmission method shown in FIG. 17 may be subjected to FDM together with signal (e.g., data) transmission to which another subcarrier spacing is applied.

Figure 19:
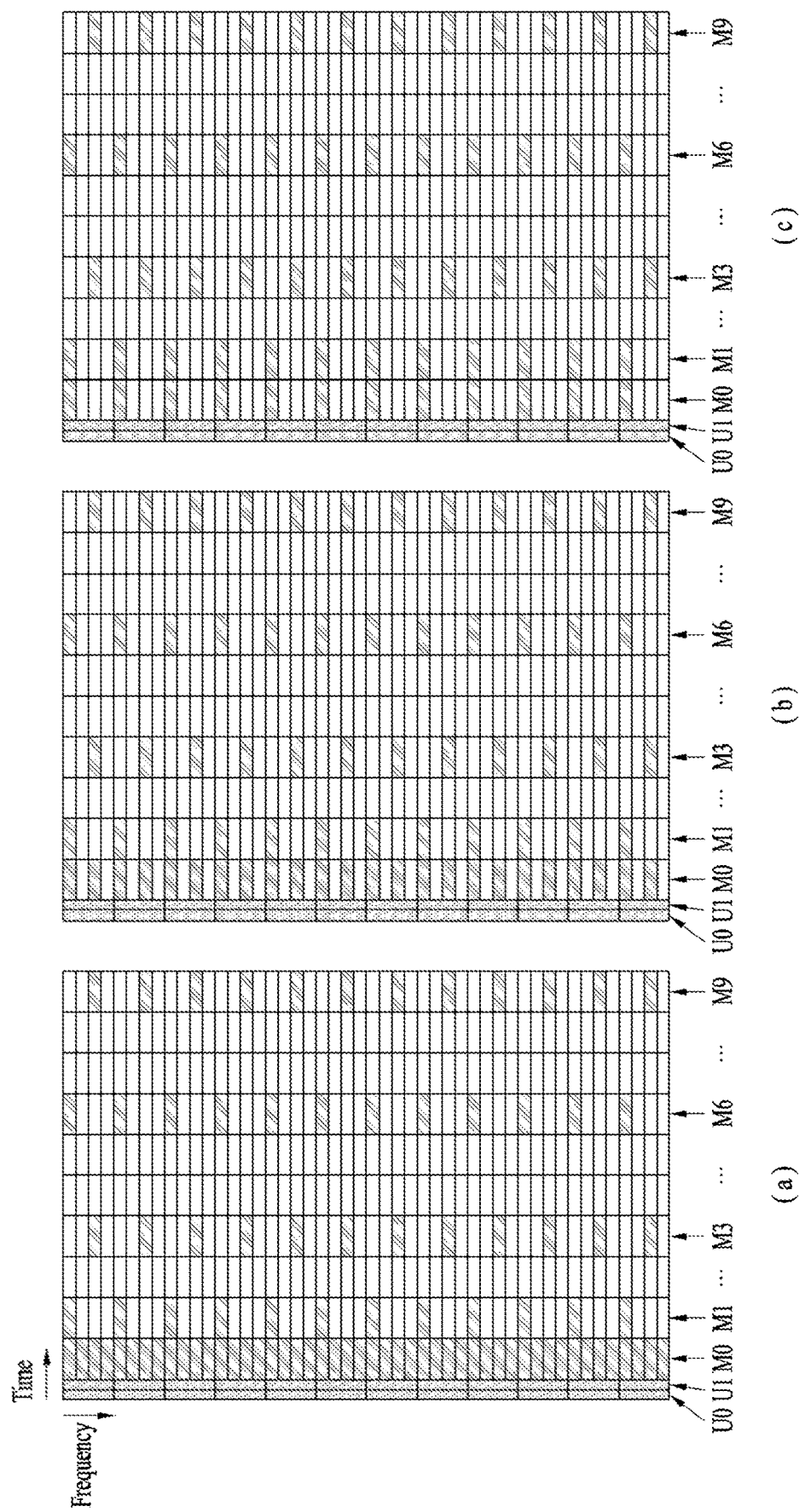

Also, as shown in FIG. 19, the RS may be transmitted from a fourth symbol (e.g., M4) after the second symbol (e.g., M1). That is, the RS of FIG. 17 is transmitted from symbols spaced at a spacing of two symbols from the second symbol (e.g., M1), whereas the RS of FIG. 19 may be transmitted from symbols spaced at a spacing of two symbols based on the first symbol (e.g., M0) after the second symbol (e.g., M1).

At this time, even in case of FIG. 19, a frequency resource to which the RS is transmitted from a first symbol (e.g., M0) where a subcarrier spacing is rapidly reduced in a time dimension may include a frequency resource to which the RS is transmitted from a second symbol (e.g., M1) which is next symbol of the first symbol.

Figure 20:
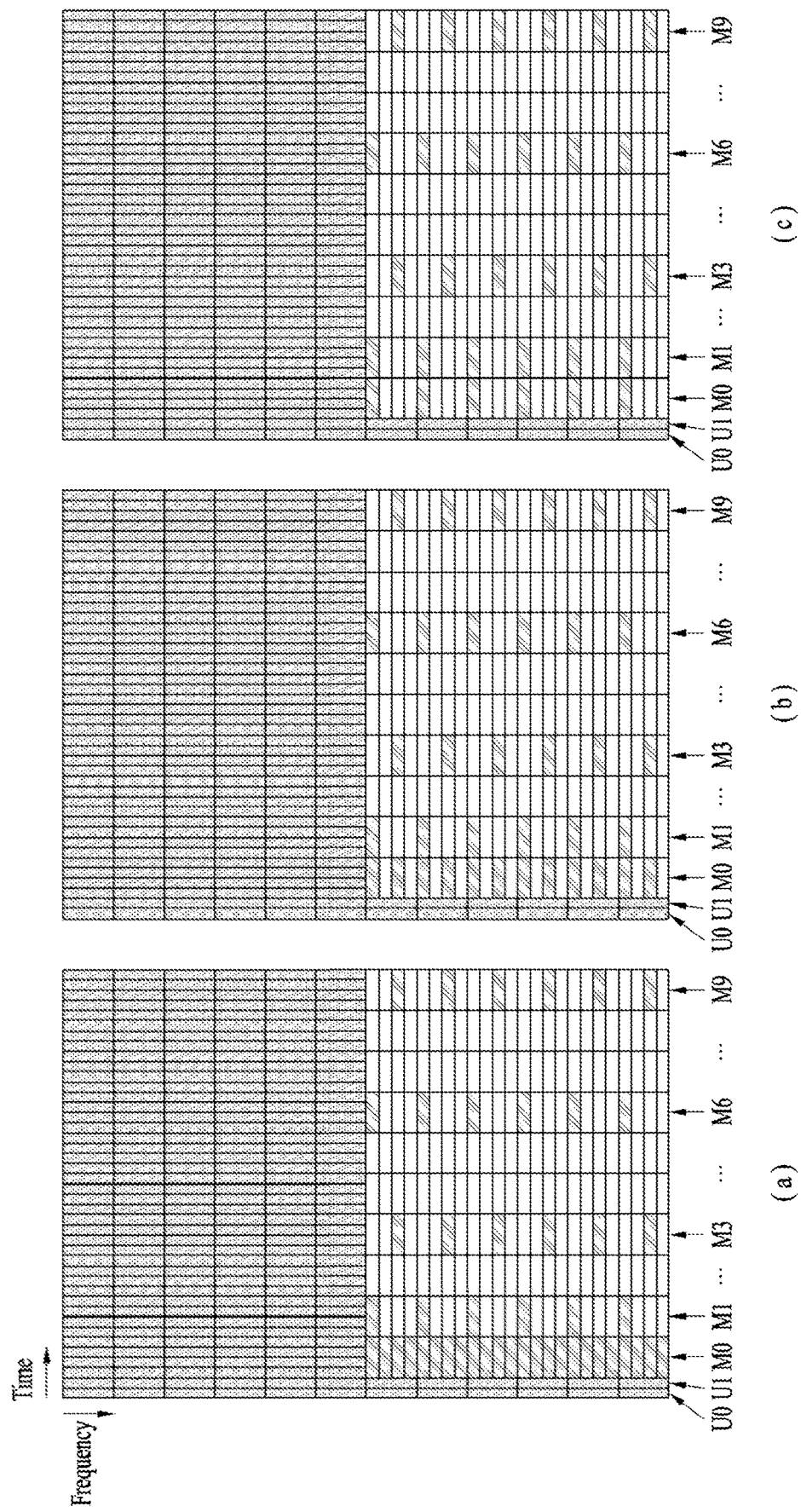

Also, as shown in FIG. 20, the RS transmission method shown in FIG. 19 may be subjected to FDM together with signal (e.g., data) transmission to which another subcarrier spacing is applied.

3.1.4. 1-4th Method

Figure 21:
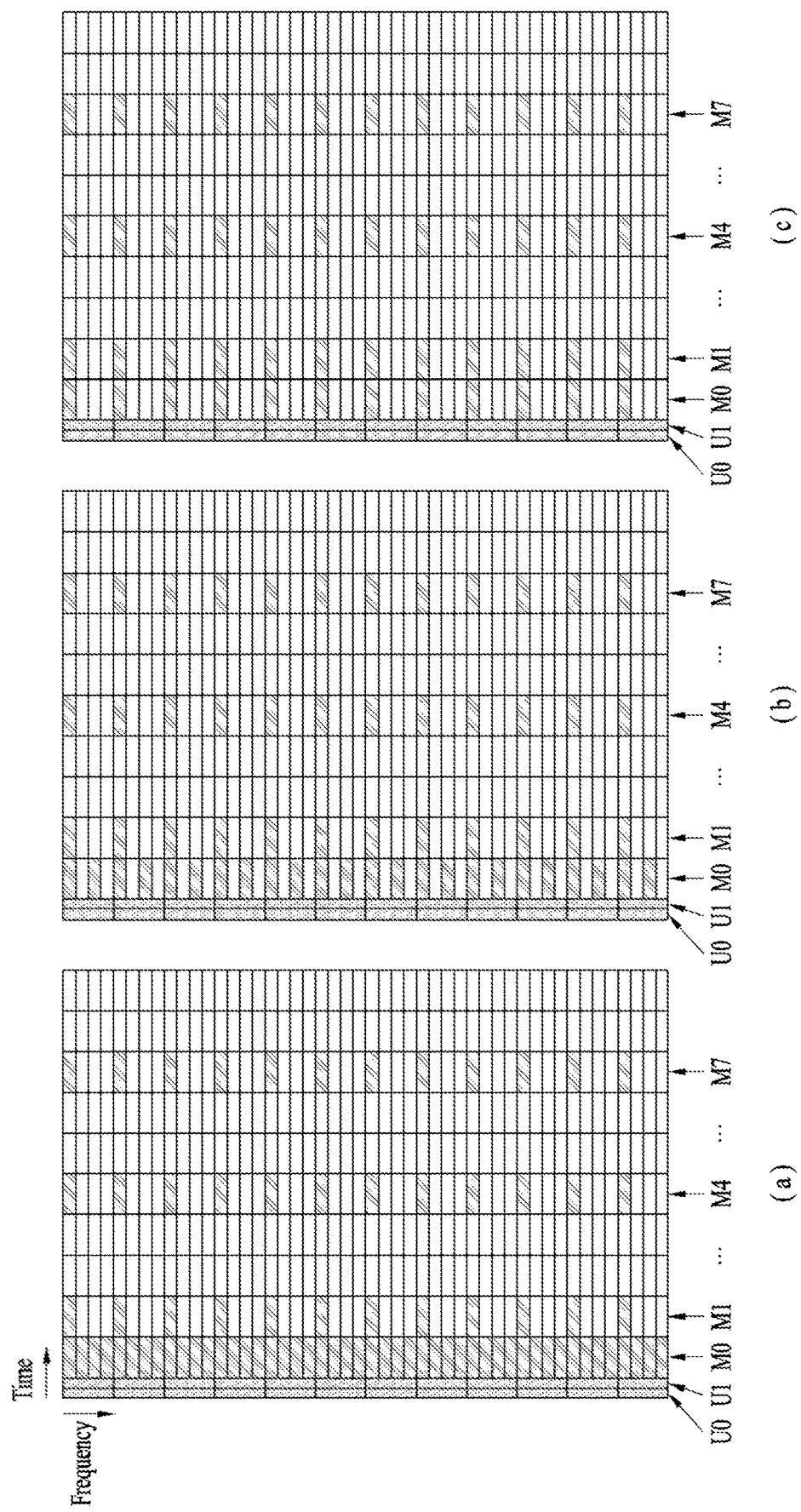
FIGS. 21 and 22 are diagrams simply illustrating RS transmission method according to the 1-4th method proposed in the present invention.
Figure 22:
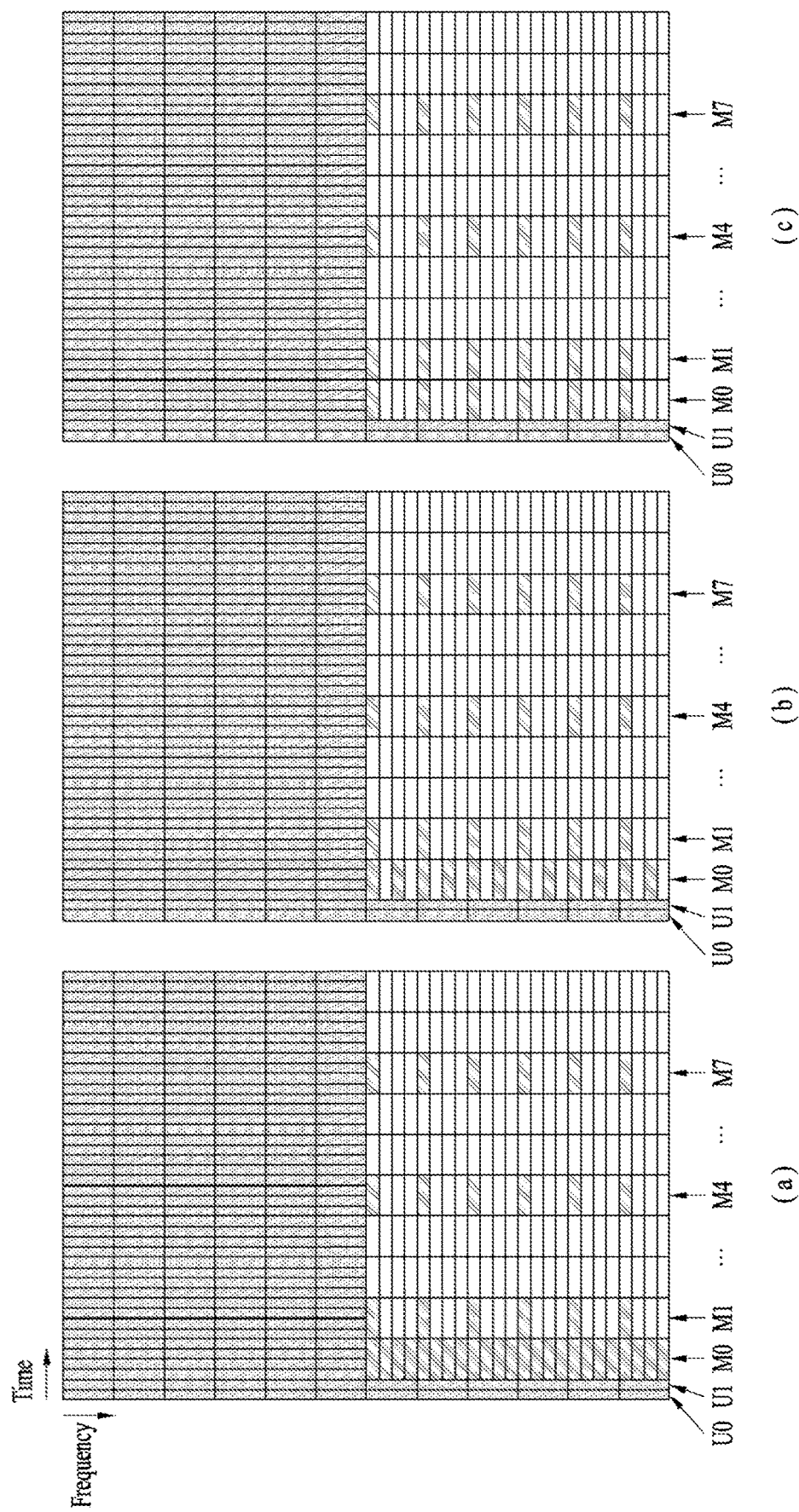

FIGS. 21 and 22 are diagrams simply illustrating RS transmission method according to the 1-4th method proposed in the present invention.

First of all, as shown in FIG. 21, a frequency resource to which the RS is transmitted from a first symbol (e.g., M0) where a subcarrier spacing is rapidly reduced in a time dimension may include a frequency resource to which the RS is transmitted from a second symbol (e.g., M1) which is next symbol of the first symbol. At this time, the RS may be transmitted through symbols spaced at a spacing of two symbols from the second symbol (e.g., M1). Particularly, the RSs transmitted after the second symbol may be transmitted through the same subcarrier.

Also, as shown in FIG. 22, the RS transmission method shown in FIG. 21 may be subjected to FDM together with signal (e.g., data) transmission to which another subcarrier spacing is applied.

3.2. Second Method

Hereinafter, unlike the first method described as above, a configuration for transmitting a separate signal for frequency offset pull-in and tracking prior to RS transmission will be described in detail.

Particularly, the separate signal is referred to as a synchronization signal (SS) for convenience of description. However, the person skilled in the art to which the present invention pertains may easily devise that the separate signal may be indicated by another configuration such as a preamble signal in accordance with an application example.

3.2.1. 2-1th Method

Figure 23:
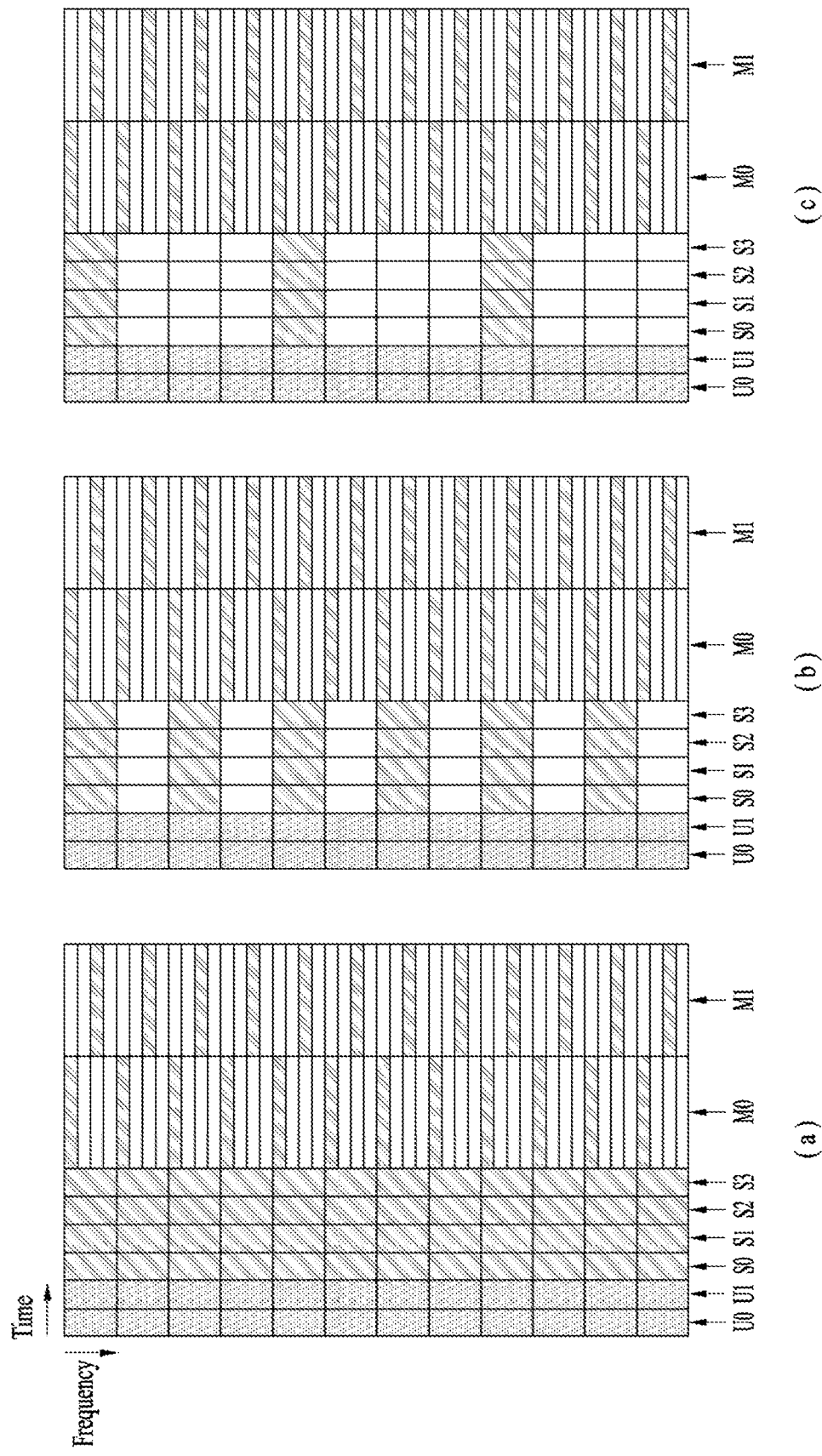
FIG. 23 is a diagram simply illustrating RS and SS transmission method according to the 2-1th method proposed in the present invention.

FIG. 23 is a diagram simply illustrating RS and SS transmission method according to the 2-1th method proposed in the present invention.

As shown in FIG. 23, SS may be transmitted through one or more symbols prior to a first symbol (e.g., M0) where a subcarrier spacing is rapidly reduced in a time dimension. At this time, in FIG. 23, a subcarrier spacing applied to symbols (e.g., U0 and U1) to which unicast is transmitted is equal to a subcarrier spacing applied to symbols (e.g., S0, S1, S2 and S3) to which the SS is transmitted. However, the subcarrier spacing applied to each symbol may be varied. In this case, the subcarrier spacing applied to symbols (e.g., S0, S1, S2 and S3) to which the SS is transmitted may be smaller than the subcarrier spacing applied to symbols (e.g., U0 and U1) to which unicast is transmitted, but may be greater than the subcarrier spacing applied to symbols (e.g., M0 and M1) to which the RS is transmitted.

This SS (or MBSFN SS) may be transmitted prior to a starting part of (MBSFN) OFDM symbols to which the RS is transmitted, whereby the SS may be used for frequency offset pull-in and tracking.

For example, the MBSFN SS may be designed to have the same SCS as that of unicast OFDM symbol where MBSFN related RRC information is received. In this case, since the MBSFN SS has the same SCS as that of the unicast OFDM symbol which is previously transmitted, there is no problem in frequency pull-in but the MBSFN SS may serve to lower a residual frequency error by using the MBSFN RS such that there is no frequency pull-in and tracking. At this time, the MBSFN SS may be transmitted in the form of multi-cell synchronization equally to the MBSFN RS.

Alternatively, as described above, the MBSFN SS may be designed to have SCS smaller than that applied to the unicast OFDM symbol which is previously transmitted, and have SCS greater than SCS applied to the symbol to which the MBSFN RS is transmitted. In this case, there may be a frequency pull-in problem as compared with the unicast OFDM symbol which is previously transmitted. However, SCS greater than SCS applied to the MBSFN RS which is transmitted later may be applied to the MBSFN SS, whereby the MBSFN SS may serve to lower a residual frequency error by using the MBSFN RS such that there is no frequency pull-in and tracking.

The receiver uses a phase change between two SS symbols to which the MBSFN SS is transmitted, to acquire CFO and lower a residual frequency error. To this end, the SS symbols include a plurality of symbols. The SS symbols constituting the MBSFN SS may have a symbol length smaller than that of the MBSFN symbol.

If the SCS applied to the MBSFN RS is ¼ of the SCS applied to the MBSFN SS as shown in FIG. 23, one symbol duration within a time period where the MBSFN RS is transmitted corresponds to a length of four times of one symbol duration within a time period where the MNSFN SS is transmitted. Therefore, the MBSFN SS may be transmitted through four symbols. At this time, the receiver may estimate frequency offset by using the following information.

Average of phase difference between two adjacent SS symbols (e.g.: [S0, S1], [S1, S2], [S2, S3])

Average of phase difference between SS symbols spaced at a spacing of 2 symbols (e.g.: [S0, S2], [S1, S3])

Usage of phase difference between SS symbols spaced at a spacing of 3 symbols (e.g.: [S0, S3])

The receiver may solve a frequency offset pull-in and tracking problem, which may occur in the MBSFN OFDM symbol or MBSFN chunk by minimizing a residual frequency error using the information from the MBSFN SS. Particularly, the receiver may estimate frequency offset for the MBSFN RS more reliably by estimating frequency offset using the phase difference between the SS symbols spaced at a spacing of 3 symbols similar to one symbol duration within the time period where the MBSFN RS is transmitted.

As shown in FIG. 23, the (MBSFN) SS may be transmitted to a frequency band which includes some frequency band within the first symbol to which the (MBSFN) RS is transmitted for one or more symbol durations (e.g., 4 symbols). As a configuration for this, the (MBSFN) SS may be transmitted from all frequency bands within the one or more symbol durations as shown in FIG. 23(*a*), or the (MBSFN) SS may be transmitted to a frequency band which includes some frequency band within the first symbol to which the (MBSFN) RS is transmitted as shown in FIG. 23(*b*) or (*c*). Therefore, in case of FIG. 23(*b*) or (*c*), overhead of the (MBSFN) SS may be reduced. At this time, data may be transmitted from a subcarrier position to which the (MBSFN) SS is not transmitted. As the data, MBMS data or unicast data may be used.

Figure 24:
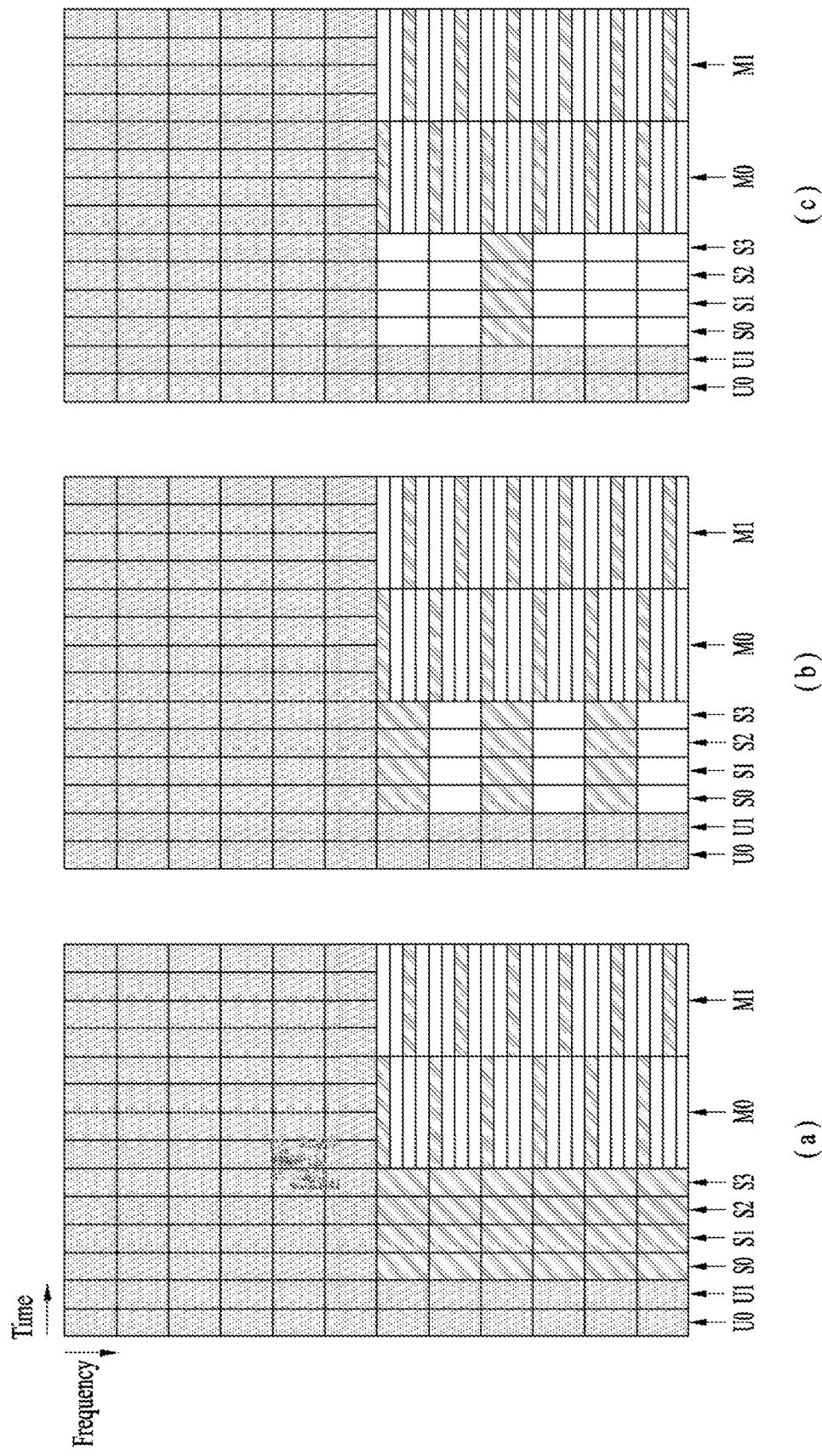
FIG. 24 is a diagram simply illustrating an extended example of RS and SS transmission method according to the 2-1th method proposed in the present invention.

FIG. 24 is a diagram simply illustrating an extended example of RS and SS transmission method according to the 2-1th method proposed in the present invention.

As shown in FIG. 24, the RS and SS transmission configuration shown in FIG. 23 may coexist with unicast transmission in a Frequency Division Multiplexing (FDM) scheme. In other words, two kinds of subcarrier spacing exist for a frequency band to which RS and SS subjected to FDM are transmitted, whereas only one subcarrier spacing may exist for a frequency band (e.g., frequency band where unicast transmission is performed) to which RS and SS subjected to FDM are not transmitted.

Alternatively, a subcarrier spacing, which is different from that of resource areas (e.g., U0 and U1) where the unicast transmission is performed, that of resource areas (e.g., S0, S1 and S2) to which the SS is transmitted and that of resource areas (e.g., M0, M1 and M2) to which the RS is transmitted, may be applied to the resource area to which the RS and SS are not transmitted. Therefore, two kinds of subcarrier spacing may exist for the frequency band to which the RS and SS are not transmitted, but may be different from the subcarrier spacing applied to the resource areas to which the RS and SS are transmitted.

3.1.2. 1-2th Method

Figure 25:
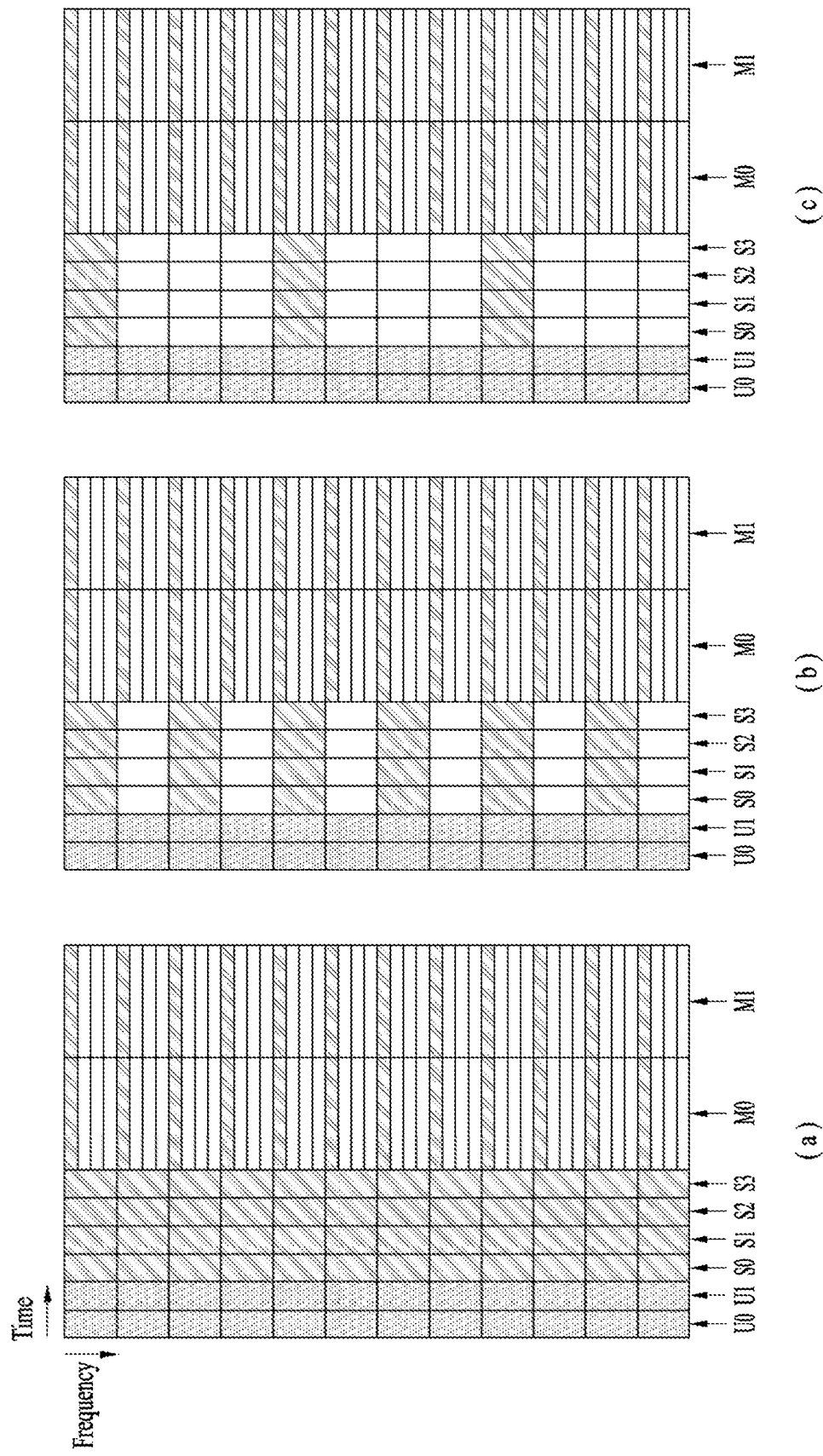
FIG. 25 is a diagram simply illustrating RS and SS transmission method according to the 2-2th method proposed in the present invention.

FIG. 25 is a diagram simply illustrating RS and SS transmission method according to the 2-2th method proposed in the present invention.

As shown in FIG. 25, the SS may be transmitted through one or more symbols prior to a first symbol (e.g., M0) where a subcarrier spacing is rapidly reduced in a time dimension.

Characteristically, in the 2-2th method of the present invention, a frequency position of the RS is configured equally in at least two symbols (e.g., M0 and M1) as compared with the 2-1th method. At this time, this configuration may include that the frequency position where the RS is arranged is configured equally for one unit time (e.g., subframe).

At this time, in FIG. 25, a subcarrier spacing applied to symbols (e.g., U0 and U1) to which unicast is transmitted is equal to a subcarrier spacing applied to symbols (e.g., S0, S1, S2 and S3) to which the SS is transmitted. However, the subcarrier spacing applied to each symbol may be varied. In this case, the subcarrier spacing applied to symbols (e.g., S0, S1, S2 and S3) to which the SS is transmitted may be smaller than the subcarrier spacing applied to symbols (e.g., U0 and U1) to which unicast is transmitted, but may be greater than the subcarrier spacing applied to symbols (e.g., M0 and M1) to which the RS is transmitted.

This SS (or MBSFN SS) may be transmitted prior to a starting part of (MBSFN) OFDM symbols to which the RS is transmitted, whereby the SS may be used for frequency offset pull-in and tracking.

As shown in FIG. 25, the MBSFN SS may be transmitted to a frequency band which includes some frequency band within the first symbol to which the MBSFN RS is transmitted for one or more symbol durations (e.g., 4 symbols). As a configuration for this, the MBSFN SS may be transmitted from all frequency bands within the one or more symbol durations as shown in FIG. 25(a), or the MBSFN SS may be transmitted to a frequency band which includes some frequency band within the first symbol to which the MBSFN RS is transmitted as shown in FIG. 25(b) or (c). Therefore, in case of FIG. 25(b) or (c), overhead of the MBSFN SS may be reduced. At this time, data may be transmitted from a subcarrier position to which the MBSFN SS is not transmitted. As the data, MBMS data or unicast data may be used.

Figure 26:
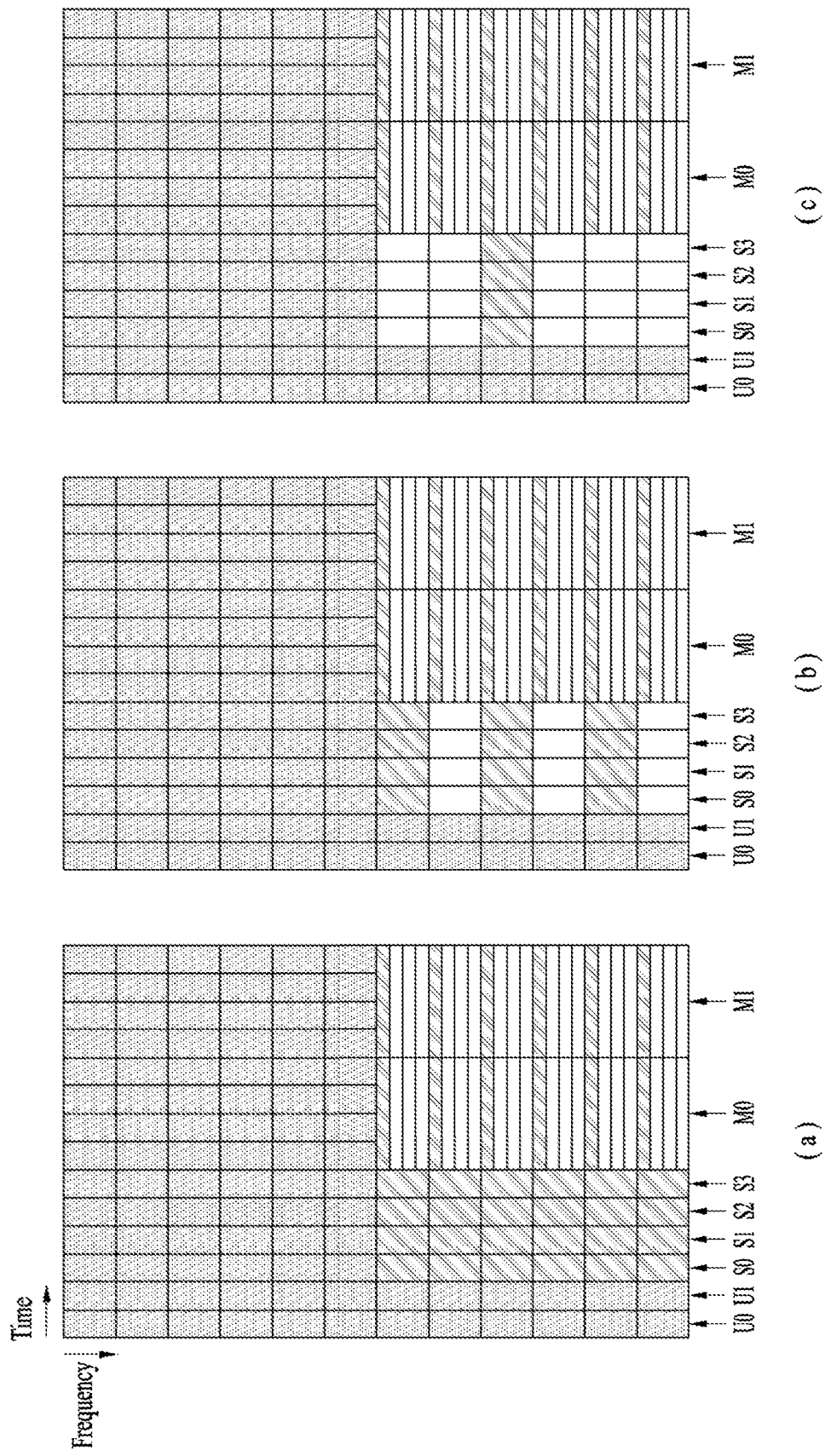
FIG. 26 is a diagram simply illustrating an extended example of RS and SS transmission method according to the 2-2th method proposed in the present invention.

FIG. 26 is a diagram simply illustrating an extended example of RS and SS transmission method according to the 2-2th method proposed in the present invention.

As shown in FIG. 26, the RS and SS transmission configuration shown in FIG. 25 may coexist with unicast transmission in a Frequency Division Multiplexing (FDM) scheme. In other words, two kinds of subcarrier spacing exist for a frequency band to which RS and SS subjected to FDM are transmitted, whereas only one subcarrier spacing may exist for a frequency band (e.g., frequency band where unicast transmission is performed) to which RS and SS subjected to FDM are not transmitted.

Alternatively, a subcarrier spacing, which is different from that of resource areas (e.g., U0 and U1) where the unicast transmission is performed, that of resource areas (e.g., S0, S1 and S2) to which the SS is transmitted and that of resource areas (e.g., M0, M1 and M2) to which the RS is transmitted, may be applied to the resource area to which the RS and SS are not transmitted. Therefore, two kinds of subcarrier spacing may exist for the frequency band to which the RS and SS are not transmitted, but may be different from the subcarrier spacing applied to the resource areas to which the RS and SS are transmitted.

3.2.3. 2-3th Method

The case that the (MBSFN) RS is transmitted per (MBSFN) symbol on the assumption that the (MBSFN) RS is transmitted at a time spacing the same as that of the unicast RS (or similar Doppler throughput is supported) has been described as above.

However, in the 2-3th method and the 2-4th method according to the present invention, the (MBSFN) RS may not be transmitted per symbol to reduce RS overhead. In other words, the (MBSFN) RS is transmitted from some of the (MBSFN) OFDM symbols but the (MBSFN) RS may not be transmitted from the other some of the (MBSFN) OFDM symbols.

Figure 27:
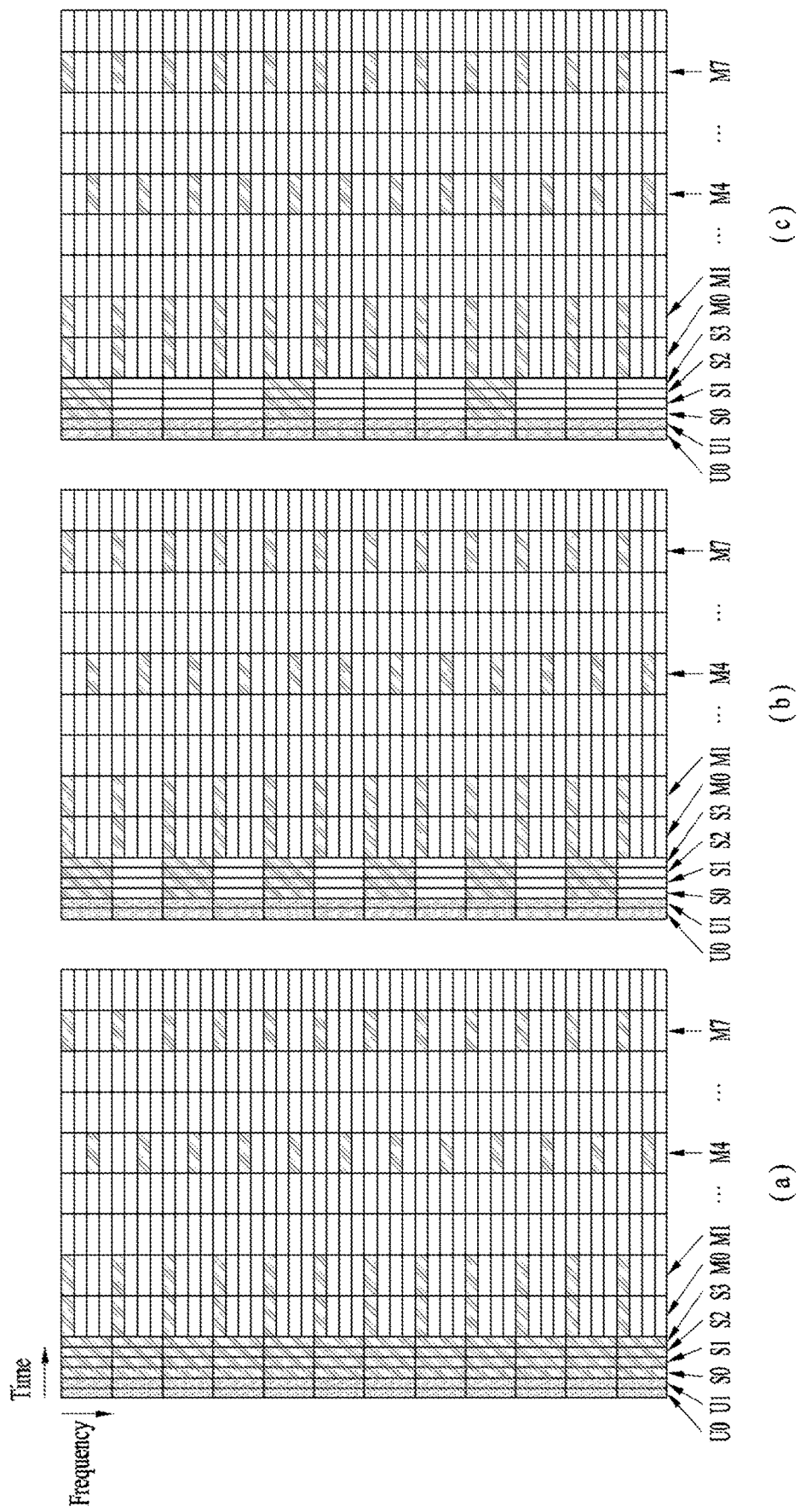
FIGS. 27 and 28 are diagrams simply illustrating RS and SS transmission method according to the 2-3th method proposed in the present invention.
Figure 28:
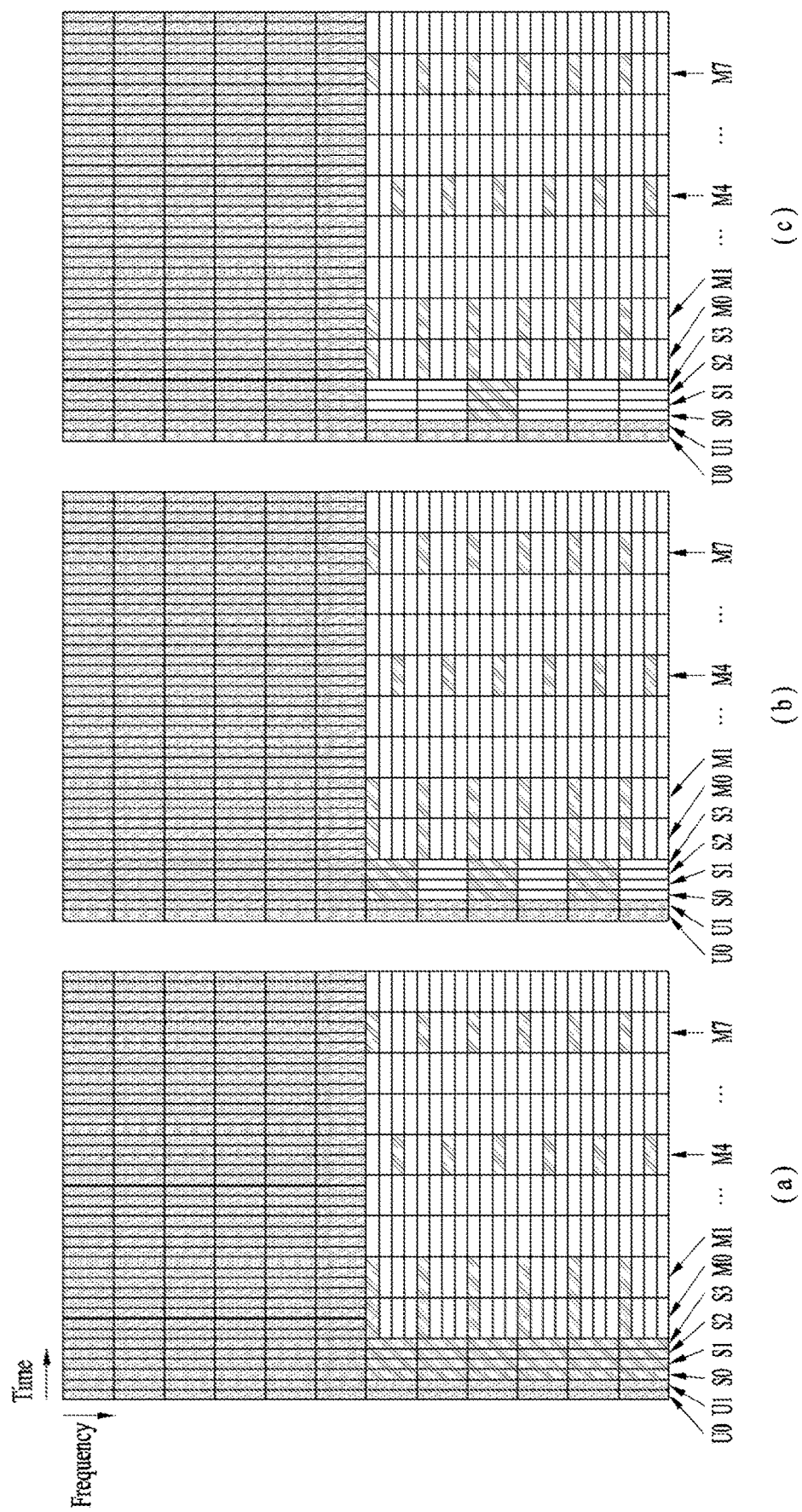

FIGS. 27 and 28 are diagrams simply illustrating RS and SS transmission method according to the 2-3th method proposed in the present invention.

First of all, as shown in FIG. 27, the SS may be transmitted through one or more symbols prior to a first symbol (e.g., M0) where a subcarrier spacing is rapidly reduced in a time dimension. At this time, in FIG. 27, a subcarrier spacing applied to symbols (e.g., U0 and U1) to which unicast is transmitted is equal to a subcarrier spacing applied to symbols (e.g., S0, S1, S2 and S3) to which the SS is transmitted. However, the subcarrier spacing applied to each symbol may be varied. In this case, the subcarrier spacing applied to symbols (e.g., S0, S1, S2 and S3) to which the SS is transmitted may be smaller than the subcarrier spacing applied to symbols (e.g., U0 and U1) to which unicast is transmitted, but may be greater than the subcarrier spacing applied to symbols (e.g., M0 and M1) to which the RS is transmitted.

This SS (or MBSFN SS) may be transmitted prior to a starting part of (MBSFN) OFDM symbols to which the RS is transmitted, whereby the SS may be used for frequency offset pull-in and tracking.

At this time, as shown in FIG. 27, the RS may be transmitted through symbols spaced at a spacing of two symbols from the second symbol (e.g., M1).

As a detailed example, the SS may be transmitted from all frequency resources within the symbols (e.g., S0, S1, S2 and S3) to which the SS is transmitted as shown in FIG. 28(a), or may be transmitted from only some frequency resource within the first symbol as shown in FIGS. 28(b) and (c). As a result, SS overhead may be reduced.

Also, as shown in FIG. 28, the RS and SS transmission method shown in FIG. 28 may be subjected to FDM together with signal (e.g., data) transmission to which another subcarrier spacing is applied.

3.2.4. 2-4th Method

Figure 29:
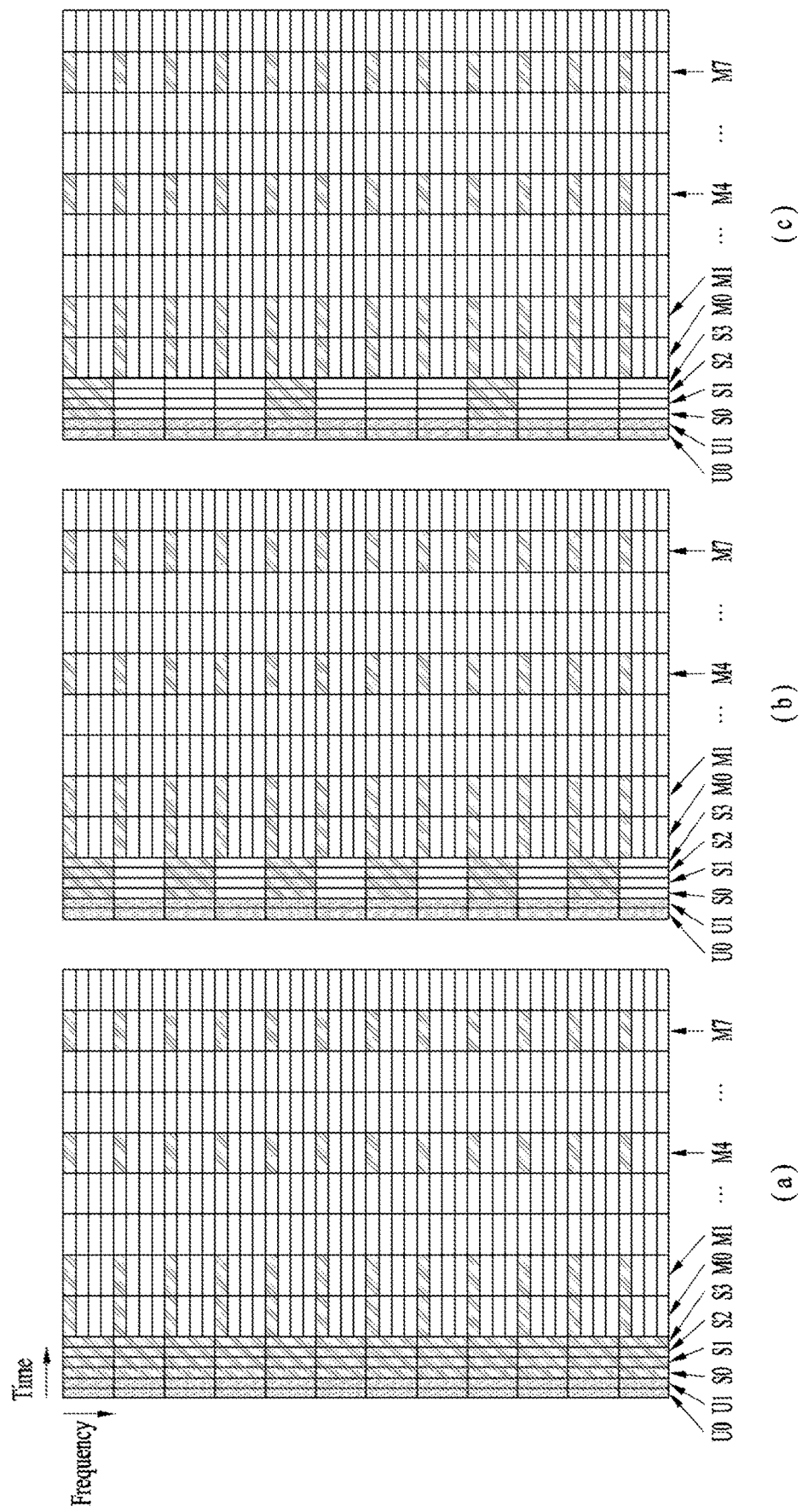
FIGS. 29 and 30 are diagrams simply illustrating an extended example of RS and SS transmission method according to the 2-3th method proposed in the present invention.
Figure 30:
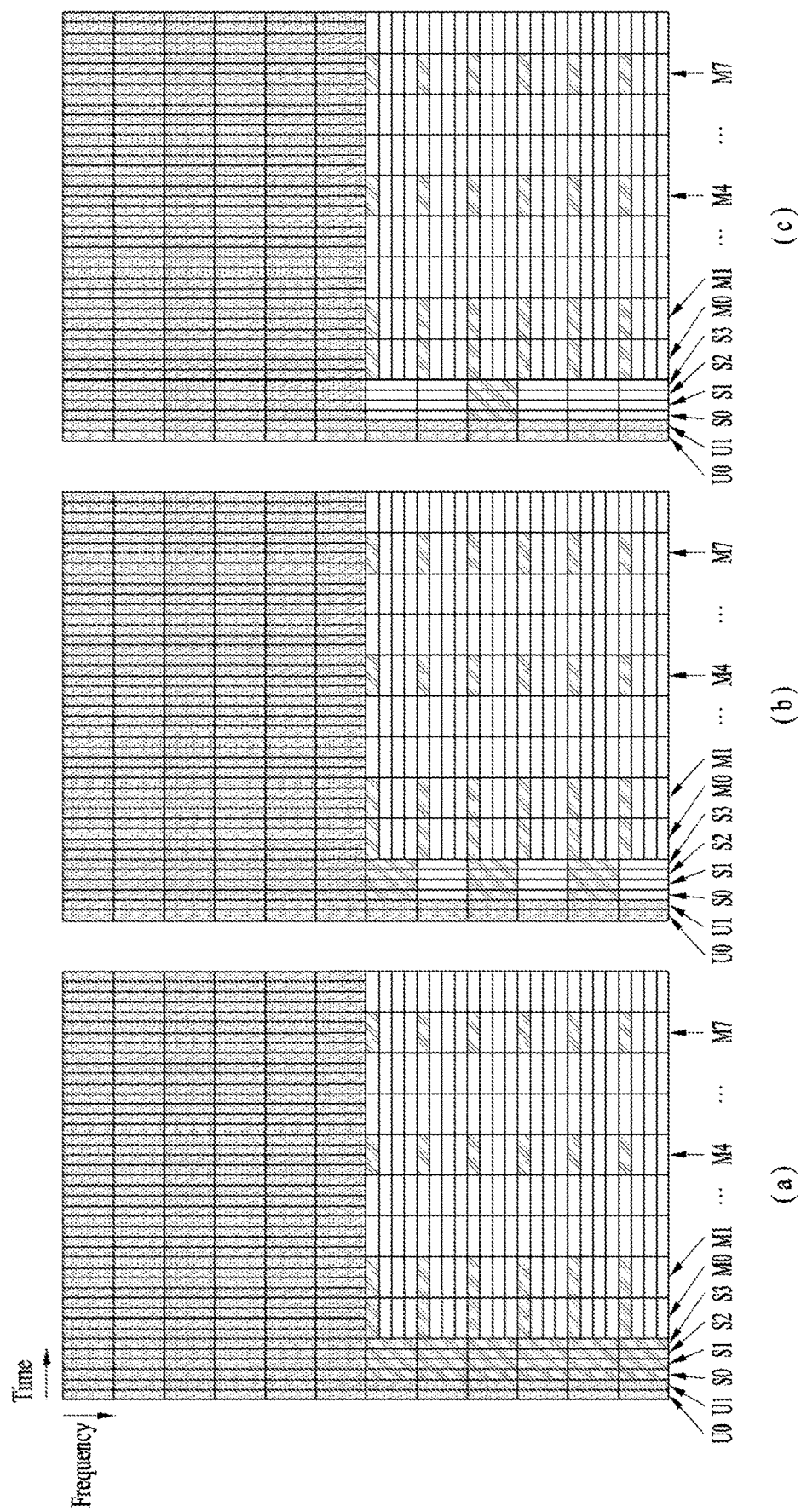

FIGS. 29 and 30 are diagrams simply illustrating RS and SS transmission method according to the 2-4th method proposed in the present invention.

First of all, as shown in FIG. 29, a frequency resource to which the RS is transmitted from a first symbol (e.g., M0) where a subcarrier spacing is rapidly reduced in a time dimension may include a frequency resource to which the RS is transmitted from a second symbol (e.g., M1) which is next symbol of the first symbol. At this time, the RS may be transmitted through symbols spaced at a spacing of two symbols from the second symbol (e.g., M1). Particularly, the RSs transmitted after the second symbol may be transmitted through the same subcarrier.

At this time, the SS may be transmitted from all frequency resources within the symbols (e.g., S0, S1, S2 and S3) to which the SS is transmitted as shown in FIG. 29(*a*), or may be transmitted from only some frequency resource within the first symbol as shown in FIGS. 29(*b*) and (*c*). As a result, SS overhead may be reduced.

Also, as shown in FIG. 30, the RS and SS transmission method shown in FIG. 29 may be subjected to FDM together with signal (e.g., data) transmission to which another subcarrier spacing is applied.

3.2. Third Method

Hereinafter, unlike the second method in which the symbol durations to which the SS is transmitted are continuously arranged, a configuration in which some of the symbol durations to which the SS is transmitted are discontinuously arranged will be described.

3.3.1. 3-1th Method

Figure 31:
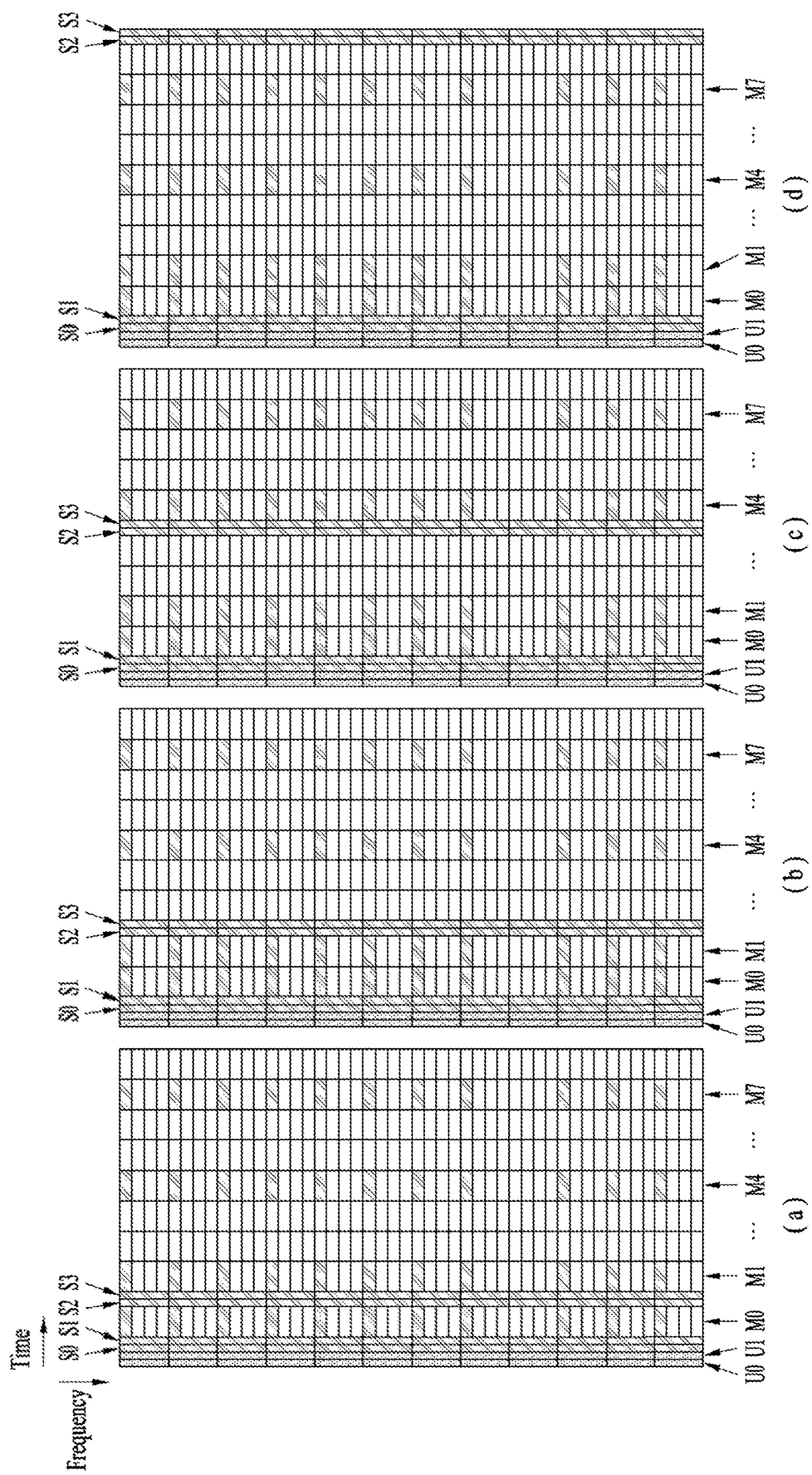
FIG. 31 is a diagram simply illustrating RS and SS transmission method according to the 3-1th method proposed in the present invention.

FIG. 31 is a diagram simply illustrating RS and SS transmission method according to the 3-1th method proposed in the present invention.

As shown in FIG. 31, some of symbols to which the SS is transmitted may be positioned prior to a first symbol (e.g., M0) where a subcarrier spacing is rapidly reduced in a time dimension, and the other symbols to which the SS is transmitted may be positioned after the first symbol in the time dimension. At this time, the other symbols may be positioned to adjoin the front/rear of the symbol to which the RS is transmitted as shown in FIGS. 31(*a*), (*b*), (*c*) and (*d*), or may be positioned at the last time area within a certain time unit (e.g., subframe, slot, etc.).

In detail, as shown in FIG. 31(*a*), a pair of SS symbols may be positioned prior to a symbol where RS transmission starts, and the other pair of SS symbols may be positioned to be spaced at a spacing of one (MBSFN) OFDM symbol. Otherwise, as shown in FIG. 31(*b*), the other pair of SS symbols may be positioned to be spaced at a spacing of two (MBSFN) OFDM symbols. Otherwise, as shown in FIG. 31(*c*), the other pair of SS symbols may be positioned to be spaced at a spacing of four (MBSFN) OFDM symbols. Otherwise, as shown in FIG. 31(*d*), the other pair of SS symbols may be positioned at the last part of a subframe to minimize a residual frequency error.

The RS and SS transmission method described as above may be subjected to FDM with a unicast signal (e.g., unicast data). Also, as a method for reducing the SS overhead, the SS may be positioned at only some subcarrier position within the symbol to which the SS is transmitted. At this time, data may be transmitted from some subcarrier position to which the SS is not transmitted.

3.3.2. 3-2th Method

If the aforementioned 3-1th method is more generalized, one or more of symbols to which the SS is transmitted may be positioned after the first symbol (e.g., M0) to which the RS is transmitted.

Figure 32:
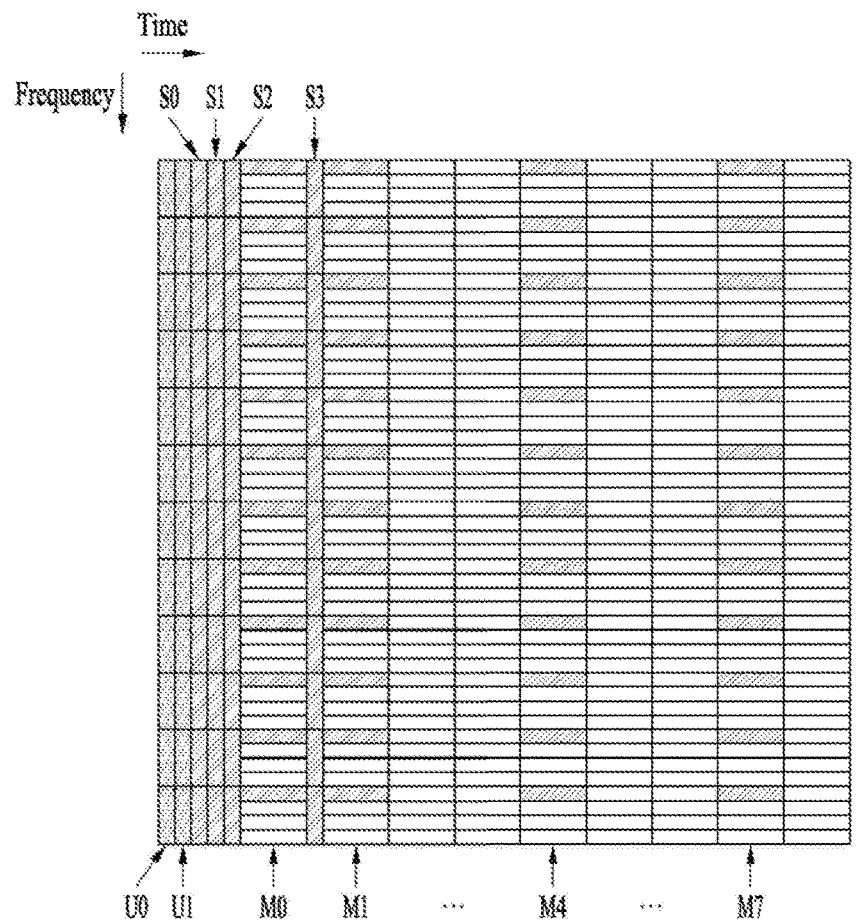
FIG. 32 is a diagram simply illustrating an extended example of RS and SS transmission method according to the 3-2th method proposed in the present invention.

FIG. 32 is a diagram simply illustrating an extended example of RS and SS transmission method according to the 3-2th method proposed in the present invention.

As shown in FIG. 32, a fourth one (e.g., S3) of the symbols to which the SS is transmitted may be positioned to be spaced apart from the other three SS symbols (e.g., S0, 1, and S2) at a spacing of one (MBSFN) OFDM symbol within time period where the RS is transmitted.

In this case, the receiver may solve a synchronization problem of the first (MBSFN) OFDM symbol by reducing a residual frequency error using a phase difference between S0/S1/S2 and S3.

The RS and SS transmission method described as above may be subjected to FDM with a unicast signal (e.g., unicast data). Also, as a method for reducing the SS overhead, the SS may be positioned at only some subcarrier position within the symbol to which the SS is transmitted. At this time, data may be transmitted from some subcarrier position to which the SS is not transmitted.

3.4. Others 3.4.1. Applicable Sequence

As a sequence applicable to the RS/SS of the aforementioned first to third methods, Zadoff-Chu based sequence having excellent time/frequency autocorrelation performance may be used.

Alternatively, as the RS of the present invention, the RS in the aforementioned MBSFN RS sequence generation method may be used.

3.4.2. Case that RS/SS is Transmitted Over a Plurality of Unit Times (e.g.: Subframes)

If the RS (and SS) is scheduled to be transmitted over continuous time units (e.g.: subframes) (or thus frequency acquisition has no problem), RS/SS transmission within a specific (MBSFN) transmission subframe may be omitted to reduce overhead of the RS/SS. At this time, a resource position of the RS/SS may be fixed such that the receiver may know the position of the RS/SS, or whether the RS/SS is included in a specific subframe may be transmitted to the receiver in the form of Downlink Control Information (DCI).

Also, if data (e.g., MBMS data) are transmitted continuously over continuous unit times (e.g., subframes), the RS transmitted by the transmitter may be configured in various patterns as follows, such that the receiver may perform frequency tracking using a phase difference between the RSs transmitted from the same position in a frequency dimension between the unit times.

For example, in FIG. 12, when RS pattern transmitted like M0 and M2 is referred to as A and RS pattern transmitted like M1 is referred to as B, a pattern of RS within one unit time (e.g., subframe) shown in FIG. 12 becomes A-B-A. At this time, if index i for a unit time is added to identify a pattern of RS between different unit times (e.g., subframes) and thus is expressed as Ai-Bi-Ai, RS pattern within a first unit time is A1-B1-A1. At this time, if the RS is transmitted even for a second unit time subsequently to the first unit time, two patterns may be applied within the second unit time as follows.

(1) A2-B2-B2 pattern (that is, pattern repetition system)
(2) B2-A2-B2 pattern (that is, pattern swapping system)

If the RS to which the pattern of (1) is applied is transmitted subsequently to the RS pattern shown in FIG.

12, the transmitter transmits the RS in the form of (A1-B1-A1)-(A2-B2-A2) pattern. At this time, since A1 and A2 have the same pattern, the receiver may perform frequency/time tracking at a unit time boundary (e.g., subframe boundary).

Alternatively, if the RS to which the pattern of (2) is applied is transmitted subsequently to the RS pattern shown in FIG. 12, the transmitter transmits the RS in the form of (A1-B1-A1)-(B2-A2-B2) pattern. At this time, the receiver may measure frequency offset by using a phase difference between (A1-A1) and (A1-A2) between (B1-B2) and (B2-B2). According to this configuration, although tracking performance at the unit time boundary (e.g., subframe boundary) of the receiver may be more lowered than the case that the pattern of (1) is applied, the receiver may perform uniform tracking within the unit time and at the unit time boundary.

In this way, since there is some difference in frequency/time tracking performance between the aforementioned patterns (1) and (2), frequency/time tracking performance may be controlled to be suitable for a specific value by appropriately using the two patterns.

As an example applicable to the pattern (2), a simple swapping or time reversal pattern may be used (pattern 2-1), or a swapping pattern having a design feature of the aforementioned first method may be used (pattern 2-2).

For example, if it is assumed that the RS pattern shown in FIG. 13(a) is H1-A1-B1, RS pattern of a unit time subsequent to the unit time shown in FIG. 13(a) may be B2-A2-H2 in accordance with the pattern 2-1. Alternatively, RS pattern of a unit time subsequent to the unit time shown in FIG. 13(a) may be H2-B2-A2 in accordance with the pattern 2-2.

This pattern configuration may equally be applied to RS pattern shown in FIG. 13(b).

However, since RS pattern shown in FIG. 13(c) is configured in the form of A1-A1-B1, RS pattern transmitted within next unit time may be B2-A2-A2 (in case of application of pattern 2-1), or B2-B2-A2 (in case of application of pattern 2-2), whereby frequency continuity may be maintained in RS pattern of first two (MBSFN) OFDM symbols within the next unit time.

Additionally, in another aspect different from the aforementioned patterns (1) and (2), RS configuration may be varied per unit time.

In detail, if RS per symbol within one unit time is transmitted by only one pattern (e.g., pattern X or pattern Y), RS transmitted per unit time may be arranged in pattern X or Y. Preferably, respective patterns different from each other may be applied to the RSs transmitted per continuous unit time.

For example, if the RS pattern transmitted within a first unit time (e.g., first subframe) is A1-A1-A1, the RS pattern transmitted within a second unit time after the first unit time may be determined as follows.

(3) B2-B2-B2 pattern (that is, pattern alternation)

If the pattern (3) is applied to the unit time subsequent to the unit time shown in FIG. 15(c), the RS pattern may be (A1-A1-A1)-(B2-B2-B2). In this case, although frequency/time tracking efficiency continuous between unit times may be more lowered than pattern repetition (that is, (A1-A1-A1)-(A2-A2-A2)) corresponding to the pattern (1), frequency diversity may be enhanced in a frequency selective channel.

The aforementioned RS (and SS) design methods according to the first to third methods may equally be applied to even the case that a unicast service having a small subcarrier spacing like MBSFN is supported within the same unit time (e.g., subframe) without being limited to MBSFN which corresponds to multi-cell synchronous transmission.

Hereinafter, when the RS (and SS) is transmitted in accordance with the aforementioned various methods, a detailed operation in view of the receiver which receives the RS (and SS) will be described in detail.

Figure 33:
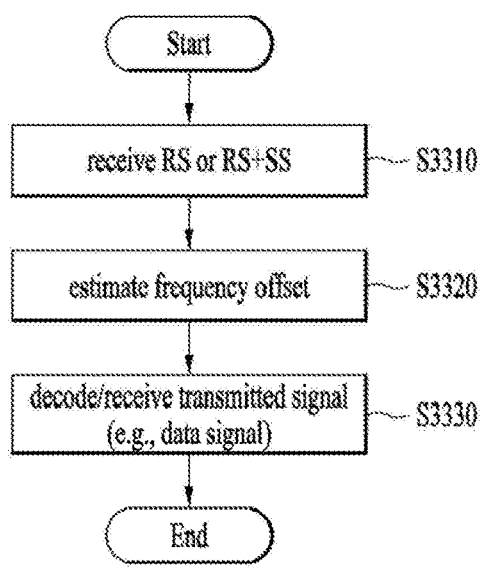
FIG. 33 is a flow chart illustrating an operation configuration of a receiver applicable to the present invention.

FIG. 33 is a flow chart illustrating an operation configuration of a receiver applicable to the present invention.

When the transmitter transmits a signal, which includes RS, in accordance with the aforementioned first method or transmits a data signal, which includes RS and SS, in accordance with the second method or the third method, the receiver receives the RS or RS and SS in response to the signal transmission (S3310).

For example, the transmitter may transmit a signal, which includes the RS, in accordance with the first method (S3310). At this time, the transmitter may transmit a signal, which includes a reference signal, through a plurality of second symbols, wherein the second symbols are continuous with a first symbol in a time domain, and a second subcarrier spacing smaller than a first subcarrier spacing applied to the first symbol is applied to the second symbols. In this case, a first frequency region to which the reference signal is transmitted on a first-order symbol among the plurality of second symbols in the order of time domain, to which the reference signal is transmitted, may include a second frequency region to which the reference signal is transmitted on a second-order symbol among the plurality of second symbols in the order of time domain, to which the reference signal is transmitted.

In response to this case, the receiver may receive the reference signal through some of the plurality of second symbols, wherein the second symbols are continuous with the first symbol in a time domain, and a second subcarrier spacing smaller than a first subcarrier spacing applied to the first symbol is applied to the second symbols. In this case, a first frequency region to which the reference signal is transmitted on a first-order symbol among the some of the plurality of second symbols in the order of time domain may include a second frequency region to which the reference signal is transmitted on a second-order symbol among the some of the plurality of second symbols in the order of time domain.

In this case, a value of four times or more of the second subcarrier spacing may be applied to the first subcarrier spacing. For example, if the second subcarrier spacing is 15/4 kHz, 15, 30, 60, 120 kHz, etc. may be applied to the first subcarrier spacing.

For example, the first frequency region may be a full frequency region to which the reference signal is transmitted, or may be a part within the full frequency region to which the reference signal is transmitted. Alternatively, the first frequency region may be equal to the second frequency region.

Also, a third frequency region to which the reference signal is transmitted on a third-order symbol among the plurality of second symbols in the order of time domain, to which the reference signal is transmitted, may be equal to the second frequency region.

Alternatively, the third-order symbol among the plurality of second symbols in the order of time domain, to which the reference signal is transmitted, may be positioned to be spaced apart from the second-order symbol as much as a certain symbol spacing.

When the transmitter transmits the signal, which includes RS, in accordance with the first method mentioned above, the receiver estimates frequency offset for the data signal by using a phase difference between the symbols to which the RS is transmitted (S3320).

As shown in FIGS. 13 to 22, the RS according to the first method is transmitted from at least first-order, and second-order symbol where the subcarrier spacing is rapidly changed in a time domain order. At this time, the RS transmitted from the first-order symbol is transmitted from a frequency region which includes a frequency region to which the RS is transmitted from at least the second-order symbol.

Therefore, the receiver may estimate (and correct) frequency offset for the data signal by using the RS transmitted from the same frequency area within two continuous symbols. As a result, the receiver may decode and receive the data signal based on the estimated frequency offset (S3330).

As described above, the receiver may reliably receive the RS and the data signal corresponding to the RS through the resource area where a subcarrier spacing is rapidly changed.

At this time, the receiver may previously acquire the RS pattern or the RS related information through separate signaling (e.g., DCI), and may receive the RS based on the acquired RS pattern or RS related information.

For another example, the transmitter may transmit the signal, which includes RS and SS, in accordance with the second method or the third method mentioned above (S3310). At this time, the transmitter may transmit a synchronization signal through a plurality of fifth symbols continuous with a fourth symbol in a time domain, and may transmit a signal including a reference signal, through a plurality of sixth symbols continuous with the plurality of fifth symbols, wherein a fourth subcarrier spacing smaller than a third subcarrier spacing applied to the fifth symbols is applied to the sixth symbols. In this case, the synchronization signal may be transmitted continuously in a time dimension within the plurality of fifth symbols.

In response to this case, the receiver may receive the synchronization signal through the plurality of fifth symbols continuous with the fourth symbol in the time domain, and may receive the reference signal through some of the plurality of sixth symbols continuous with the plurality of fifth symbols, wherein the fourth subcarrier spacing smaller than the third subcarrier spacing applied to the fifth symbols is applied to some of the sixth symbols.

In this case, the third subcarrier spacing may be smaller than or equal to the fifth subcarrier spacing applied to the fourth symbol.

Also, a frequency region to which the synchronization signal is transmitted may be a full frequency region to which the reference signal is transmitted, or may be a part within the full frequency region to which the reference signal is transmitted.

Additionally, the transmitter may additionally transmit the synchronization signal through one or more seventh symbols to which the third subcarrier spacing is applied, wherein the seventh symbols are positioned to be spaced apart from the fifth symbols as much as a spacing of one or more of the sixth symbols. In other words, as shown in FIG. 31 or 32, the transmitter may transmit the synchronization signal through discontinuous symbols. In response to this case, the receiver may additionally receive the synchronization signal in a corresponding resource position.

At this time, the one or more of the seventh symbols may be positioned at the last time area of a specific subframe.

In the above example, a third frequency region to which the reference signal is transmitted on a first-order symbol among the plurality of sixth symbols in the order of time domain, to which the reference signal is transmitted, may be equal to a fourth frequency region to which the reference signal is transmitted on a second-order symbol among the plurality of fifth symbols in the order of time domain, to which the reference signal is transmitted.

When the transmitter transmits the signal, which includes RS and SS, in accordance with the second method or the third method, the receiver estimates frequency offset for the data signal by using a phase difference (or phase difference between the symbols to which the RS is transmitted) between the symbols to which the SS is transmitted (S3320).

As shown in FIGS. 23 to 32, at least one or more symbols to which the SS according to the second method or the third method is transmitted may be positioned prior to the symbol to which the RS and the data signal are transmitted. At this time, the subcarrier spacing smaller than the subcarrier spacing applied to the symbol to which the RS and the data signal are transmitted may preferably be applied to the symbol to which the SS is transmitted.

In more detail, the receiver may estimate frequency offset for the data signal by using the phase difference between the symbols to which the SS is transmitted. At this time, as described above, the plurality of symbols to which the SS is transmitted may be positioned in the time dimension continuously or discontinuously.

Particularly, if the SS is positioned at both ends of a specific subframe or slot as shown in FIG. 31(d), a residual frequency error between the SS symbols positioned at both ends is small, whereby it may be useful in view of synchronization tracking performance of the receiver.

Also, if the SS is positioned at both ends of a time period where heterogeneous subframes or slots are multiplexed, since the receiver is able to perform channel estimation interpolation, it may be useful for channel estimation of the receiver.

Particularly, if output power transient issue (status that a signal is modified at a boundary portion due to a power difference between both subframes or slots) between the heterogeneous subframes or slots occurs, the SS (or RS) symbols may be positioned at both ends of the time period where heterogeneous subframes or slots are multiplexed, so as to preferably guard data positioned between both ends.

Additionally, the receiver may estimate frequency offset for the data signal by using the phase difference between the symbols to which the RS is transmitted. The receiver may selectively perform a frequency offset operation based on the RS. This may be determined by the receiver or configured by a control command (e.g., RRC signaling, DCI, etc.) of the transmitter.

The receiver may decode and receive the data signal based on the frequency offset estimated through the aforementioned methods (S3330).

As described above, even though the RS and data signal are received, the receiver may reliably receive the RS and the data signal through the resource area where a subcarrier spacing is rapidly changed.

At this time, the receiver may previously acquire the SS pattern, the RS pattern, the SS related information or the RS related information through separate signaling (e.g., DCI), and may receive the SS and RS based on the acquired patterns or related information.

In the above configuration, if the transmitter is eNB or gNB, the receiver may be a UE. Alternatively, if the transmitter is UE, the receiver may be eNB or gNB.

Since each embodiment of the above-described proposed method can be considered as one method for implementing the present invention, it is apparent that each embodiment can be regarded as a proposed method. In addition, the present invention can be implemented not only using the proposed methods independently but also by combining (or merging) some of the proposed methods. In addition, it is possible to define a rule that information on whether the proposed methods are applied (or information on rules related to the proposed methods) should be transmitted from the BS to the UE through a predefined signal (e.g., physical layer signal, higher layer signal, etc.).

4. Device Configuration

Figure 34:
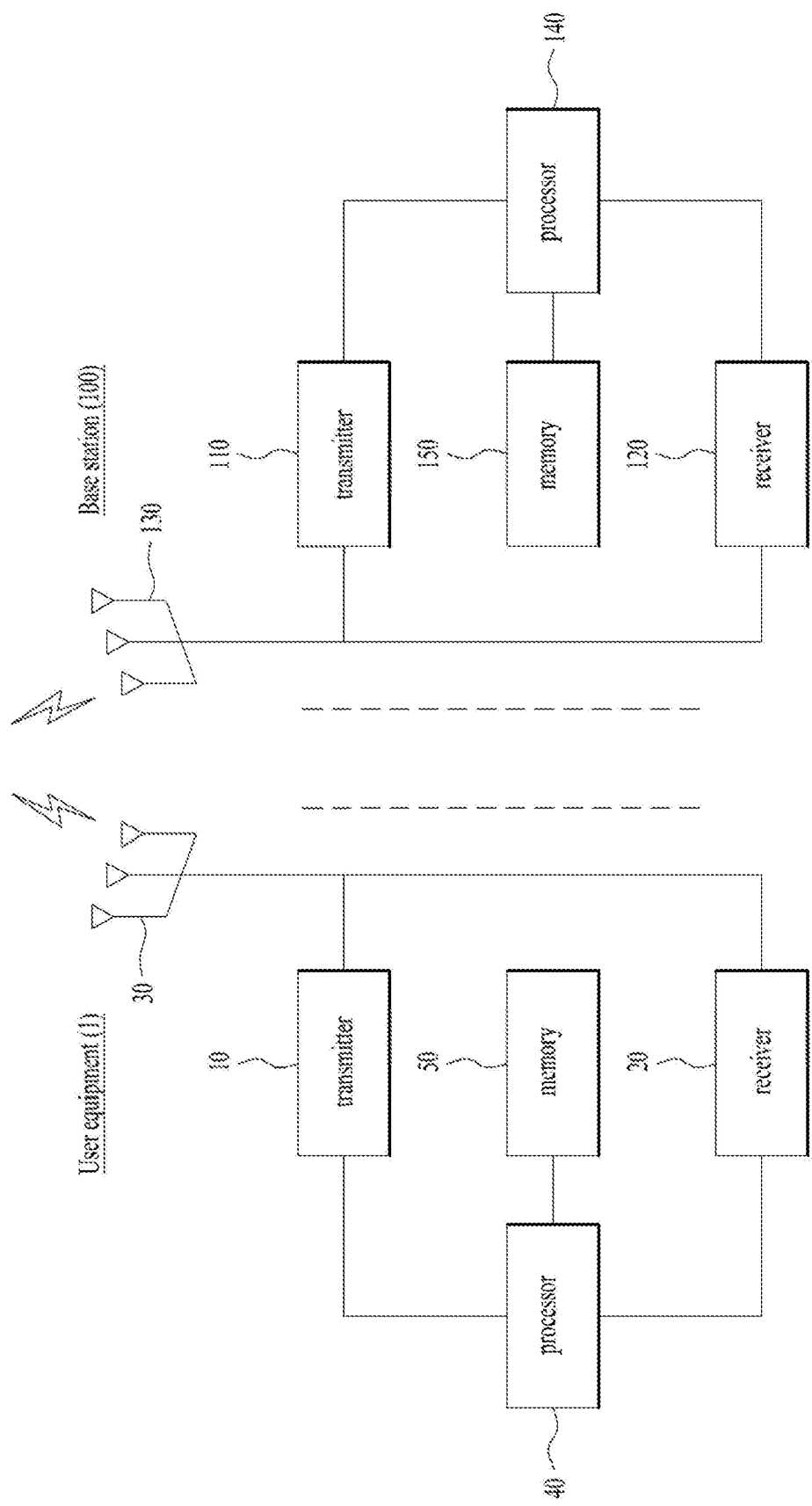
FIG. 34 is a diagram illustrating a configuration of a UE and a BS, through which the embodiments proposed in the present invention can be implemented.

FIG. 34 is a diagram illustrating configurations of a UE and a base station capable of being implemented by the embodiments proposed in the present invention. The UE and the base station shown in FIG. 34 operate to implement the embodiments of the method for transmitting and receiving signals between the UE and the base station.

A UE 1 may act as a transmission end on a UL and as a reception end on a DL. A base station (eNB or gNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

The base station 100 configured as above may transmit a downlink signal comprising a reference signal, via a plurality of second symbols through the transmitter 110 in accordance with the first method of the present invention, wherein the second symbols are continuous with a first symbol in a time domain, and a second subcarrier spacing smaller than a first subcarrier spacing applied to the first symbol is applied to the second symbols. In this case, a first frequency region to which the reference signal is transmitted on a first-order symbol among the plurality of second symbols in the order of time domain, to which the reference signal is transmitted, may include a second frequency region to which the reference signal is transmitted on a second-order symbol among the plurality of second symbols in the order of time domain, to which the reference signal is transmitted.

In response to this case, the UE 1 may receive the reference signal via some of the plurality of second symbols through the receiver 20, wherein the second symbols are continuous with the first symbol in a time domain, and a second subcarrier spacing smaller than a first subcarrier spacing applied to the first symbol is applied to the second symbols. In this case, a first frequency region to which the reference signal is transmitted on a first-order symbol among the some of the second symbols in the order of time domain may include a second frequency region to which the reference signal is transmitted on a second-order symbol among the some of the second symbols in the order of time domain. Subsequently, the UE 1 may receive the downlink signal transmitted via the plurality of second symbols by using phase difference information between the first-order and second-order symbols to which the reference signal is transmitted, through the receiver 20.

Alternatively, the base station 100 configured as above may transmit a synchronization signal via a plurality of second symbols continuous with a first symbol in a time domain through the transmitter 110 in accordance with the second method of the present invention, and may transmit a downlink signal comprising a reference signal, via a plurality of third symbols continuous with the plurality of second symbols, wherein a second subcarrier spacing smaller than a first subcarrier spacing applied to the second symbols is applied to the third symbols. In this case, the synchronization signal may be transmitted continuously in a time domain within the plurality of second symbols.

In response to this case, the UE 1 may receive the synchronization signal via the plurality of second symbols continuous with the first symbol in the time domain through the receiver 20. Subsequently, the UE 1 may estimate frequency offset by using the synchronization signal through the processor 40. Subsequently, the UE 1 may receive the downlink signal comprising the reference signal, vis a plurality of third symbols continuous with the plurality of second symbols, wherein the second subcarrier spacing smaller than the first subcarrier spacing applied to the second symbols is applied to the third symbols.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 34 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

The invention claimed is:

1. A method of transmitting a downlink signal by a base station in a wireless communication system, the method comprising:
   transmitting a downlink signal comprising a reference signal via a plurality of second symbols,
   wherein the plurality of second symbols are continuous with a first symbol in a time domain,
   wherein the plurality of second symbols are configured based on a second subcarrier spacing and the first symbol is configured based on a first subcarrier spacing,
   wherein the second subcarrier spacing is smaller than the first subcarrier spacing,
   wherein a first frequency region for the reference signal transmitted on a first-order symbol among the plurality of second symbols in the time domain comprises a second frequency region for the reference signal transmitted on a second-order symbol among the plurality of second symbols in the time domain.

2. The method of claim 1, wherein the first subcarrier spacing is a value of four times or more of the second subcarrier spacing.

3. The method of claim 1, wherein the downlink signal includes a data signal, and
   wherein the reference signal is used to estimate frequency offset applied to the data signal.

4. The method of claim 1, wherein the first frequency region is a full frequency region for the reference signal transmitted, or is a part within the full frequency region for the reference signal transmitted.

5. The method of claim 1, wherein the first frequency region is equal to the second frequency region.

6. The method of claim 1, wherein a third frequency region for the reference signal transmitted on a third-order symbol among the plurality of second symbols in the time domain is equal to the second frequency region.

7. The method of claim 1, wherein a third-order symbol among the plurality of second symbols in the order of time domain, to which the reference signal is transmitted, is positioned to be spaced apart from the second-order symbol as much as a certain symbol spacing.

8. A method of receiving a downlink signal by a user equipment in a wireless communication system, the method comprising:
   receiving a reference signal via some of a plurality of second symbols,
   wherein the plurality of second symbols are continuous with a first symbol in a time domain,
   wherein the plurality of second symbols are configured based on a second subcarrier spacing and the first symbol is configured based on a first subcarrier spacing,
   wherein the second subcarrier spacing is smaller than the first subcarrier spacing,
   wherein a first frequency region for the reference signal transmitted on a first-order symbol among the some of second symbols in the time domain includes a second frequency region for the reference signal transmitted on a second-order symbol among the some of the second symbols in the time domain; and
   receiving the downlink signal transmitted via the plurality of second symbols by using phase difference information between the first-order and second-order symbols.

9. A user equipment for receiving a downlink signal in a wireless communication system, the user equipment comprising:
   a transmitter;
   a receiver; and
   a processor operated by being connected with the transmitter and the receiver,
   wherein the processor is configured to:
   receive a reference signal via some of a plurality of second symbols,
   wherein the plurality of second symbols are continuous with a first symbol in a time domain,
   wherein the plurality of second symbols are configured based on a second subcarrier spacing and the first symbol is configured based on a first subcarrier spacing,
   wherein the second subcarrier spacing is smaller than the first subcarrier spacing,
   wherein a first frequency region for the reference signal transmitted on a first-order symbol among the some of second symbols in the time domain includes a second frequency region for the reference signal transmitted on a second-order symbol among the some of the second symbols in the time domain; and
   receive the downlink signal transmitted via the plurality of first symbols by using phase difference information between the first-order and second-order symbols.

* * * * *